US011172417B2

United States Patent
Park et al.

(10) Patent No.: US 11,172,417 B2
(45) Date of Patent: Nov. 9, 2021

(54) MULTIPLE ACCESS CONFIGURATION INFORMATION

(71) Applicant: Ofinno, LLC, Reston, VA (US)

(72) Inventors: Kyungmin Park, Vienna, VA (US); Esmael Hejazi Dinan, McLean, VA (US); Hyoungsuk Jeon, Centreville, VA (US); Nazanin Rastegardoost, McLean, VA (US); Hua Zhou, Herndon, VA (US); Ali Cagatay Cirik, Herndon, VA (US); Youngwoo Kwak, Vienna, VA (US); Yunjung Yi, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 4 days.

(21) Appl. No.: 16/866,125

(22) Filed: May 4, 2020

(65) Prior Publication Data

US 2020/0351730 A1 Nov. 5, 2020

Related U.S. Application Data

(60) Provisional application No. 62/842,473, filed on May 2, 2019.

(51) Int. Cl.
*H04W 36/00* (2009.01)
*H04W 36/08* (2009.01)
(Continued)

(52) U.S. Cl.
CPC ... *H04W 36/0077* (2013.01); *H04W 36/0058* (2018.08); *H04W 36/08* (2013.01);
(Continued)

(58) Field of Classification Search
None
See application file for complete search history.

(56) References Cited

U.S. PATENT DOCUMENTS 9,894,681 B2 * 2/2018 Dinan ............... H04L 5/0091
2013/0258958 A1 * 10/2013 Dinan ............. H04W 74/0833
370/329

(Continued)

FOREIGN PATENT DOCUMENTS

WO 2020015451 1/2020

OTHER PUBLICATIONS

3GPP TS 38.133 V15.5.0 (Mar. 2019) Release 15.
(Continued)

*Primary Examiner* — Kenny S Lin
(74) *Attorney, Agent, or Firm* — Kavon Nasabzadeh; Philip Smith; Willis Chang

(57) ABSTRACT

A wireless device receives from a second base station, a RRC message comprising access information, for a handover to a first cell of a first base station, indicating that a first timing advance of a first beam of the first cell is a timing advance of a first timing advance group of a secondary cell group and that a second timing advance of a second beam of the first cell is a timing advance of a second timing advance group of the secondary cell group. The wireless device selects, as a selected beam, one of the first beam and the second beam. The wireless device transmits transport blocks, via the selected beam of the first cell, using one of: the first timing advance in response to the selected beam being the first beam; and the second timing advance in response to the selected beam being the second beam.

20 Claims, 29 Drawing Sheets

(51) Int. Cl.
    *H04W 76/27* (2018.01)
    *H04W 56/00* (2009.01)
    *H04W 72/04* (2009.01)
    *H04W 84/20* (2009.01)

(52) U.S. Cl.
    CPC ..... *H04W 56/0045* (2013.01); *H04W 72/046* (2013.01); *H04W 76/27* (2018.02); *H04W 84/20* (2013.01)

(56) References Cited

U.S. PATENT DOCUMENTS

| | | | | |
|---|---|---|---|---|
| 2013/0272229 | A1* | 10/2013 | Dinan | H04L 5/14 370/329 |
| 2015/0327198 | A1* | 11/2015 | Axmon | H04L 5/001 370/336 |
| 2016/0099763 | A1* | 4/2016 | Chen | H04W 56/0045 370/329 |
| 2017/0331670 | A1* | 11/2017 | Parkvall | H04B 7/0617 |
| 2019/0037456 | A1* | 1/2019 | Zhang | H04W 36/0038 |
| 2019/0053183 | A1* | 2/2019 | Park | H04W 72/048 |
| 2019/0124566 | A1* | 4/2019 | Liu | H04W 36/0072 |
| 2020/0245200 | A1* | 7/2020 | Xiong | H04B 7/0626 |

OTHER PUBLICATIONS

3GPP TS 36.300 V15.4.0 (Dec. 2018); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.

3GPP TS 36.321 V15.4.0 (Dec. 2018); Technical Specification; 3rd Generation Partnership Project; Technical Specification Group Radio Access Network; Evolved Universal Terrestrial Radio Access (E-UTRA); Medium Access Control (MAC) protocol specification; (Release 15).

3GPP TS 36.331 V15.4.0 (Dec. 2018); Technical Specification; 3rd Generation Partnership Project; Technical Specification Group Radio Access Network; Evolved Universal Terrestrial Radio Access (E-UTRA); Radio Resource Control (RRC);; Protocol specification.

3GPP TS 38.212 V15.5.0 (Mar. 2019); Technical Specification; 3rd Generation Partnership Project; Technical Specification Group Radio Access Network; NR; Multiplexing and channel coding; (Release 15).

"3GPP TS 38.213 V15.5.0 (Mar. 2019); Technical Specification; 3rd Generation Partnership Project; Technical Specification Group Radio Access Network; NR;Physical layer procedures for control (Release 15); / /".

3GPP TS 38.214 V15.5.0 (Mar. 2019); Technical Specification; 3rd Generation Partnership Project; Technical Specification Group Radio Access Network; NR; Physical layer procedures for data; (Release 15).

3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).

3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).

3GPP TS 38.331 V15.5.1 (Apr. 2019); Technical Specification; 3rd Generation Partnership Project; Technical Specification Group Radio Access Network; NR; Radio Resource Control (RRC) protocol specification; (Release 15).

3GPP TS 38.423 V15.2.0 (Dec. 2018); Technical Specification; 3rd Generation Partnership Project; Technical Specification Group Radio Access Network; NG-RAN; Xn application protocol (XnAP); (Release 15).

"3GPP TSG RAN WG1 Meeting #96; Athens, Greece, Feb. 25-Mar. 1, 2019; Title: RAN1 Chairman's Notes ; 1 Opening of the Meeting (Day 1: 9.00 AM) 3".

"3GPP TSG RAN WG1 Meeting #96bis; Xi'an, China, Apr. 8-12, 2019; Title: RAN1 Chairman's Notes ; 1 Opening of the Meeting (Day 1: 9.00 AM) 3".

"R1-19005780 reply LS on NR mob enh; 3GPP TSG RAN WG1 Meeting #96bisR1-1905780 Xi'an, China, Apr. 8-12, 2019; ; Title:Reply LS on NR mobility enhancements; Response to:R1-1903863 (R2-1902745); Release:Rel-15;".

"R2-1900020_R1-1814411; 3GPP TSG RAN WG2#105; Athens, Greece, Feb. 25-Mar. 1, 2019; ; ; 3GPP TSG RAN WG1 Meeting #95R1-18144110; Spokane, USA, Nov. 12-16, 2018;".

"R2-1903271; 3GPP TSG RAN WG2 Meeting #105bis;Xi'an, China, Apr. 8-12, 2019(revision of R2-1900436) : Agenda Item:11. 9.2.2; Source:Mediatek Inc. ; Title:General Consideration on HO/SCG Interruption in NR ; Document for:Discussion, Decision;".

"R2-1903307—Further details on eMBB-based handover for NR mobility; 3GPP TSG-RAN WG2 Meeting #105bis ; Xi'an, China, Apr. 8-12, 2019; ; Agenda Item:11.9.2.2; Source: Oppo; Title:Further details on eMBB-based handover for NR mobility;".

"R2-1903330; 3GPP TSG RAN WG2 Meeting #105bis;Xi'an, China, Apr. 8-12, 2019 ; Agenda item: 11.9.2.2; Source:Mediatek Inc. ; Title: User Plane Details in Non-DC-based Solutions; Document for: Discussion and Decision;".

"R2-1903447-Non-DC based solution for 0ms interruption time v05.DOC3GPP TSG RAN WG2 Meeting #105bis; Xi'an, China, Apr. 8-12, 2019 , Agenda item:11.9.2.2; Source:Intel Corporation, China Telecom, OPPO, vivo, Mediatek Inc, ETRI, CATT; Title:Non-DC based solution for 0ms interruption time; Document for:Discussion and Decision;".

"R2-1903453-CPdetails nondc; 3GPP TSG RAN WG2 Meeting #105bis ; Xi'an, China, Apr. 8-12, 2019Revision of R2-1901364 , Agenda item:11.9.2.2; Source:Intel Corporation ; Title:Control plane consideration on simultaneous connectivity; Document for:Discussion and Decision;".

"R2-1903510—Make-Before-Break handover; 3GPP TSG-RAN WG2#105-BisTdoc ; Xian, China, Apr. 8-12, 2019; ; Agenda Item:11.9.2.2; Source:Ericsson; Title:Make-Before-Break handover;".

"R2-1903511—Comparison of MBB and DC based handover; 3GPP TSG-RAN WG2#105bisTdoc ; Xian, China, Apr. 8-12, 2019; ; Agenda Item:12.3.2; Source:Ericsson; Title:Comparison of MBB and DC based handover;".

"R2-1903564 Comparison of DC-based and non-DC-based handover solution; 3GPP TSG-RAN WG2 #105bis; Xi'an, China, Apr. 8-12, 2019; Source: Huawei, HiSilicon, Nokia, Nokia Shanghai Bell; Title: Comparison of DC-based and non-DC-based handover solution; Agenda Item:11.9.2.1; Document for:Discussion and decision;".

"R2-1903571 Handover schemes comparison under DC Scenarios; 3GPP TSG-RAN WG2 #105bis; R2-170xxxx Xi'an, China, Apr. 8-12, 2019; ; Source: Huawei, HiSilicon; Title: Handover scheme comparison under DC Scenarios; Agenda Item:11.9.2.2;".

"R2-1903640; 3GPP TSG-RAN WG2 Meeting #105bisR2-1903640; Xi'an, China, Apr. 8-12, 2019Revision of R2-1900357; ; Agenda item:11; Source:Qualcomm Incorporated;".

"R2-1903643; 3GPP TSG-RAN WG2 Meeting #105bisR2-1903643; Xi'an, China, Apr. 8-12, 2019Revision of R2-1900358; ; Agenda item:11.9.2.2; Source:Qualcomm Incorporated;".

R2-1903650; 3GPP TSG-RAN WG2 Meeting #105bisR2-1903650; Xi'an, China, Apr. 8-12, 2019 Revision of R2-1900364; Agenda item:11.9.2 ; Source:Qualcomm Incorporated; Title:Single Tx/Rx handling during MBB HO;.

"R2-1904293 Handover Execution Enhancements for Simultaneously COnnected UEs; 3GPP TSG-RAN WG2 Meeting #105bis; Xian, China, Apr. 8-12, 2019; ; ; Agenda item:11.9.2.2; Source:Nokia, Nokia Shanghai Bell;".

"RAN2-105bis-Xian-chair-notes-2019-04-12-1615-eom; 3GPP TSG-RAN WG2 Meeting #105bis Xi'an, China, Apr. 8-12, 2019; ; Source: RAN2 Chairman (Intel); Title:Chair notes; 1Opening of the meeting (9 AM);".

(56) References Cited

OTHER PUBLICATIONS

"RP-190489_WID_NR_eMob_v2.1; 3GPP TSG RAN Meeting #83 RP-190489 Shenzhen, China, Mar. 18-21, 2019 Revision of RP-181433 ; ; Source:Intel Corporation; Title:New WID: NR mobility enhancements; Document for:Approval;".
3GPP TS 36.133 V14.4.0 (Jun. 2017) Release 14.

* cited by examiner

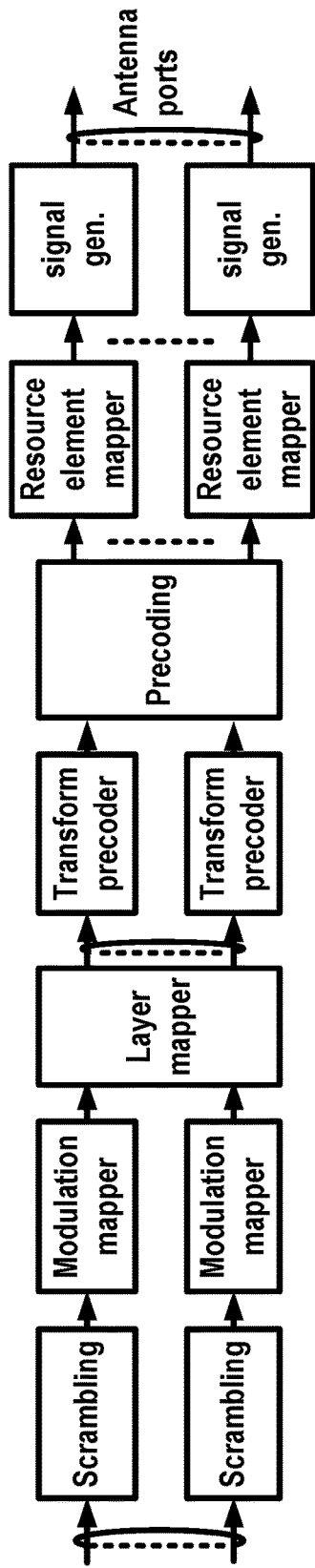
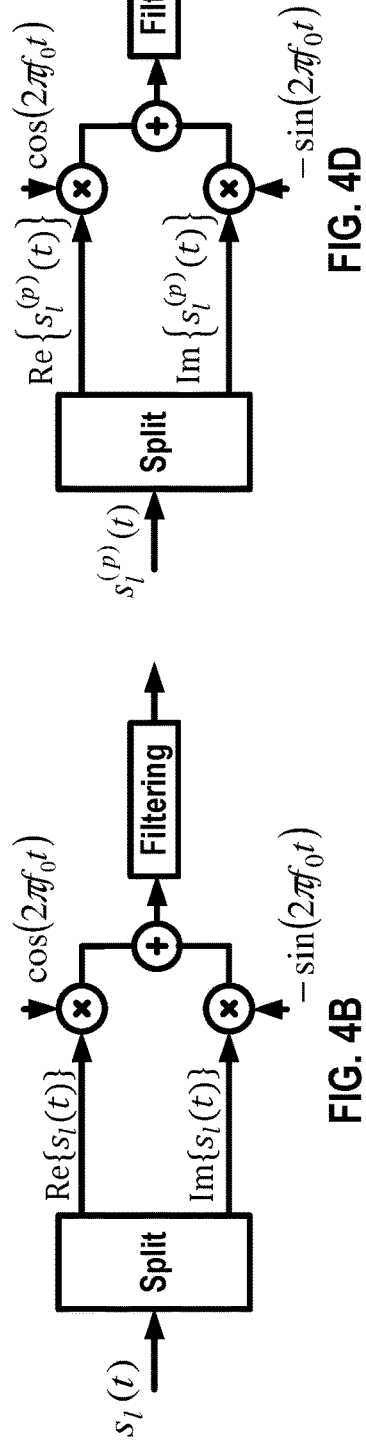
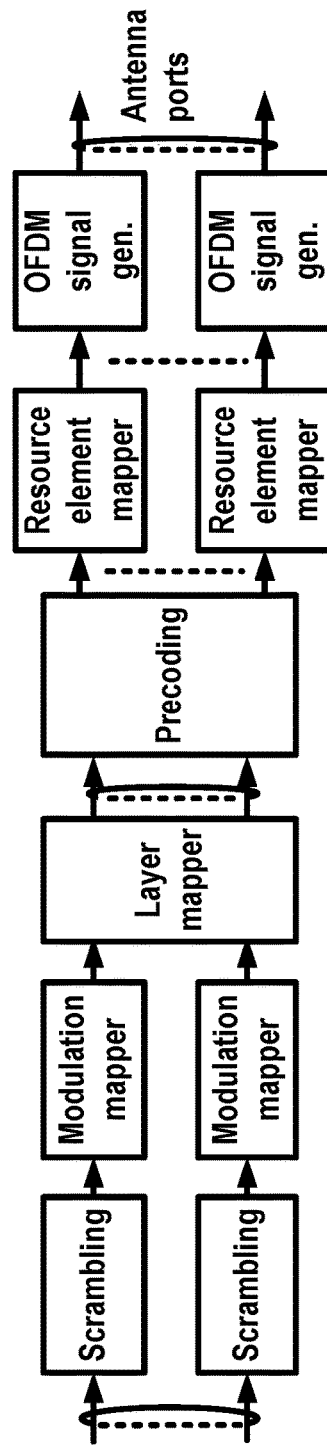
FIG. 4A
FIG. 4B
FIG. 4C
FIG. 4D

MobilityControlInfo information element

```
RACH-Skip-ResourceList           SEQUENCE (SIZE(1..maxRACH-Skip-Resources)) OF RACH-Skip-Resource
[...]
RACH-Skip-Resource(e.g., one of SSB(s), CSI-RS(s), TRP, TAG, CORESET(s), TCI-state(s), QCL-type) ::=      SEQUENCE {
  ssb(s)                           SSB-Index(s),
  (csi-RS(s)                       CSI-RS-Index(s),)
  (trp                             TRP-Index,)
  (tag                             ENUMERATED {PTAG, STAG1, STAG2, STAG3, STAG4, ...},)
  (coreset or coreset-group        CORESET-Id or CORESET-Group-Id,)
  (tci-state(s)                    TCI-StateId(s),)
  (qcl-Type1                       QCL-Info,)
  (qcl-Type2                       QCL-Info,)
  targetTA                 CHOICE {
    ta0                            NULL,
    mcg-PTAG                       NULL,
    scg-PTAG                       NULL,
    mcg-STAG                       STAG-Id,
    scg-STAG                       STAG-Id,
    ta                             INTEGER (0..63) }
  ul-ConfigInfo            SEQUENCE {
    numberOfConfUL-Processes-r14   INTEGER (1..8),
    ul-SchedInterval-r14           ENUMERATED {sf2, sf5, sf10, ..., slot2,slot4, ..., symbol2,symbol4, ...},
    ul-StartSubframe-r14           INTEGER (0..9),
    ul-Slot                        Slot-Index,
    ul-Symbol                      ENUMERATED {n1, n2, n4, ...},
    ul-Grant-r14                   BIT STRING (SIZE (16)) }          OPTIONAL     -- Need OR }
```

FIG. 26

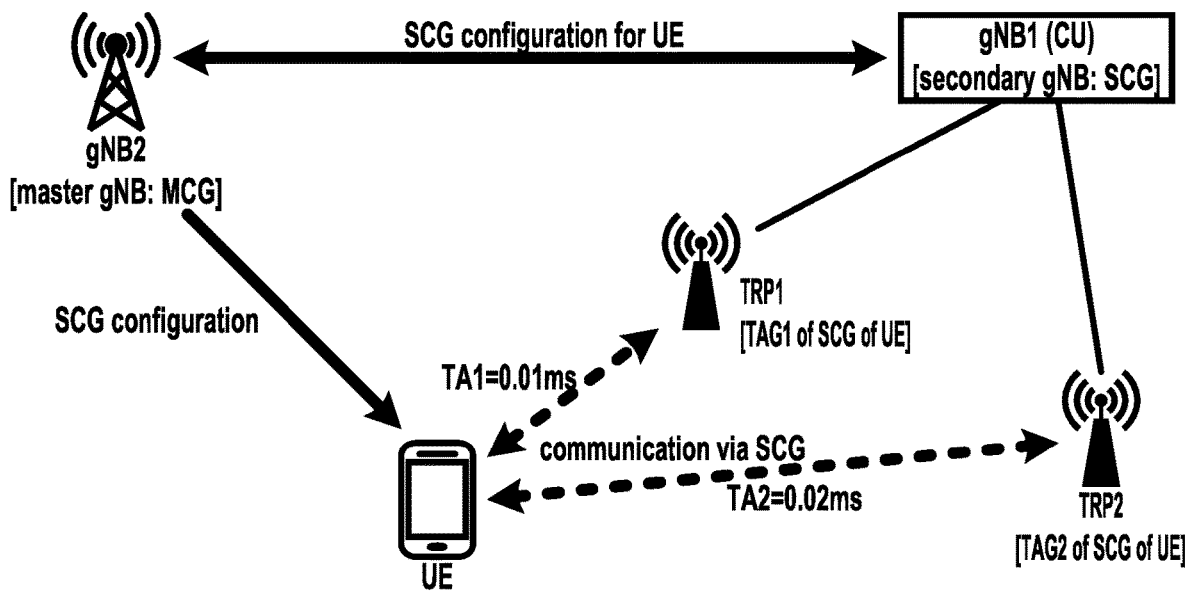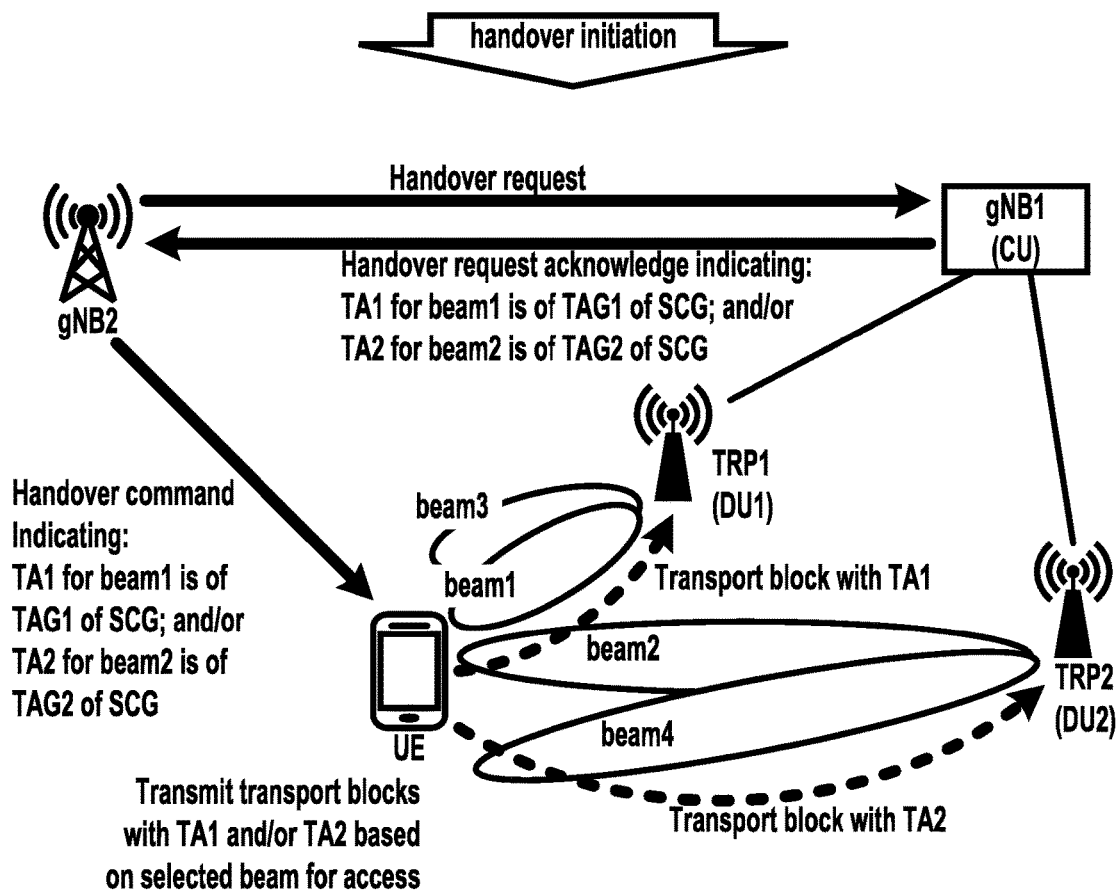
FIG. 28

MULTIPLE ACCESS CONFIGURATION INFORMATION

CROSS-REFERENCE TO RELATED APPLICATIONS

This application claims the benefit of U.S. Provisional Application No. 62/842,473, filed May 2, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 26 is a diagram of an aspect of an example embodiment of the present disclosure.

FIG. 28 is a diagram of an aspect of an example embodiment of the present disclosure.

DETAILED DESCRIPTION OF EMBODIMENTS

Figure 1:
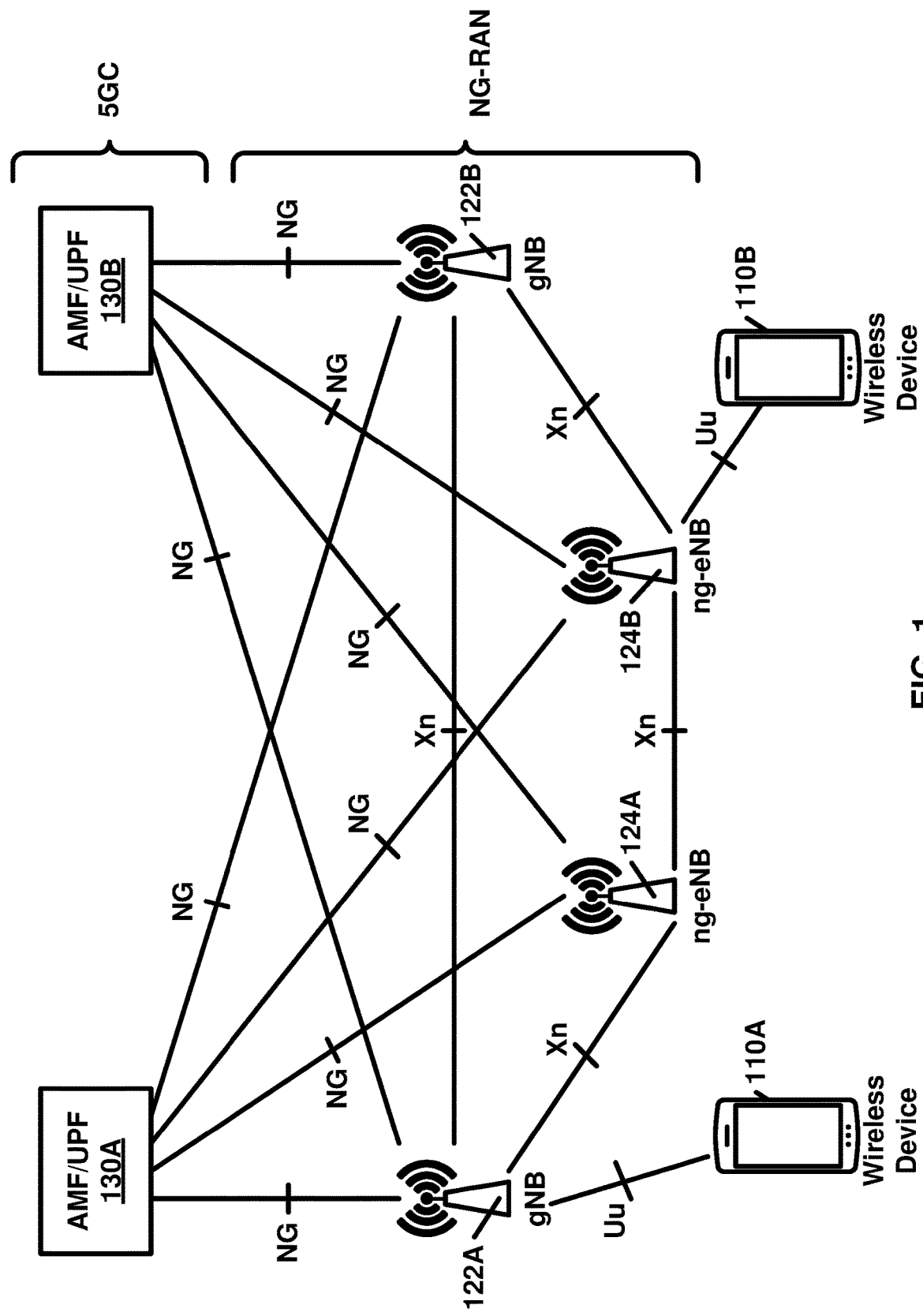
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multi-carrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
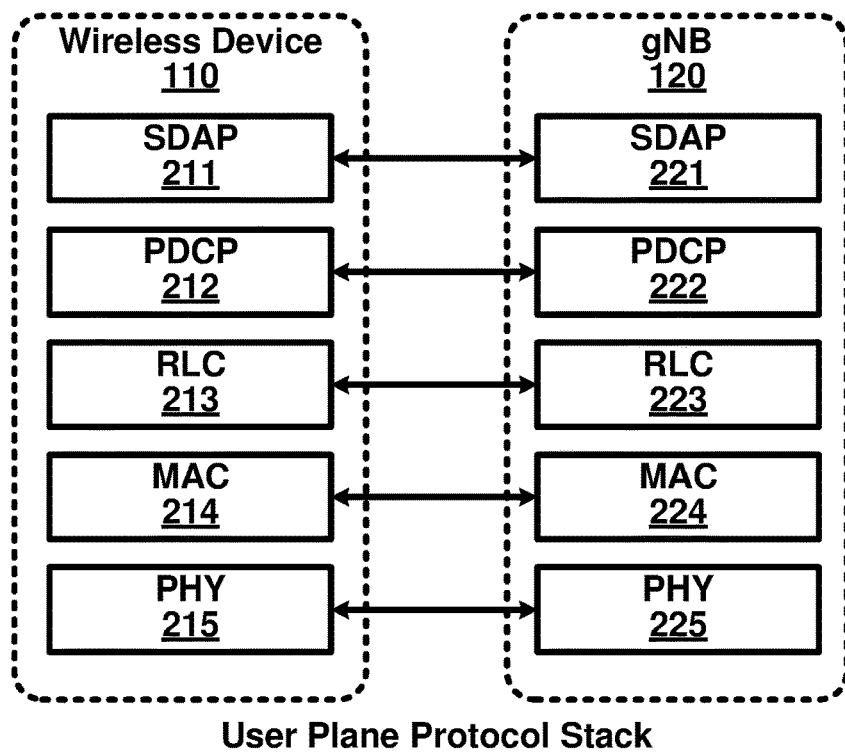
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
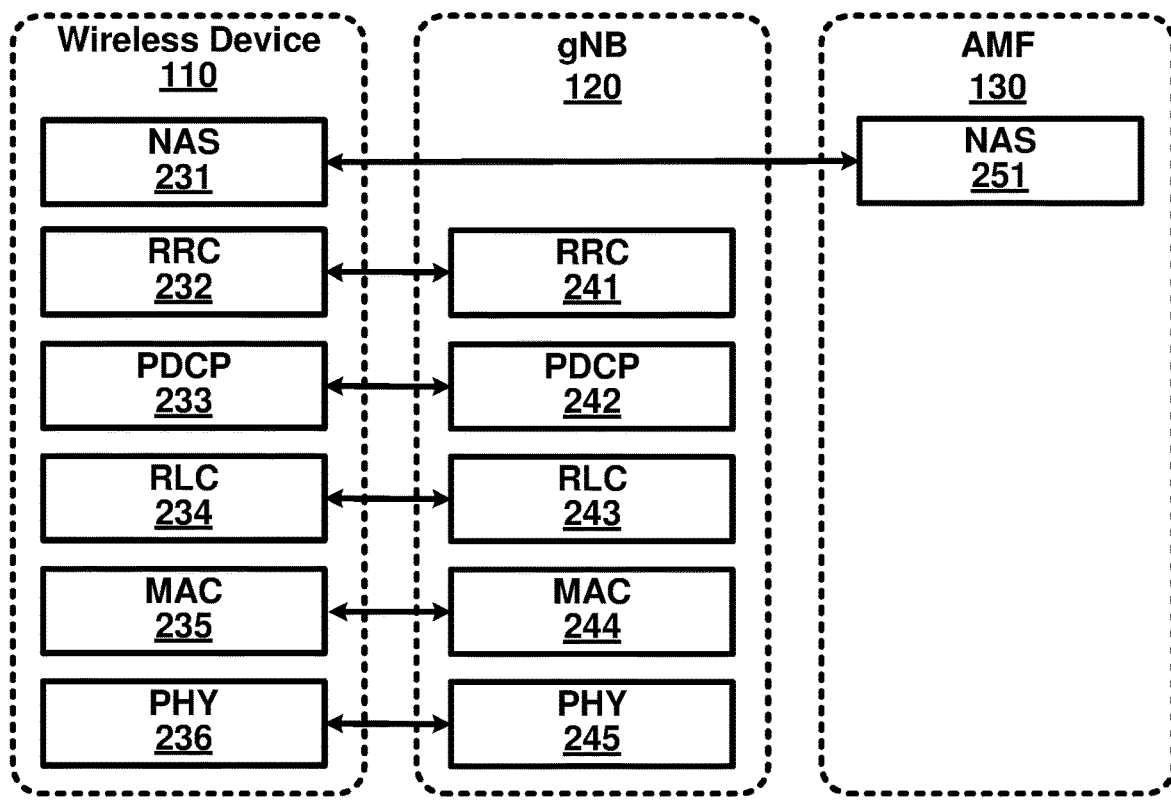
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
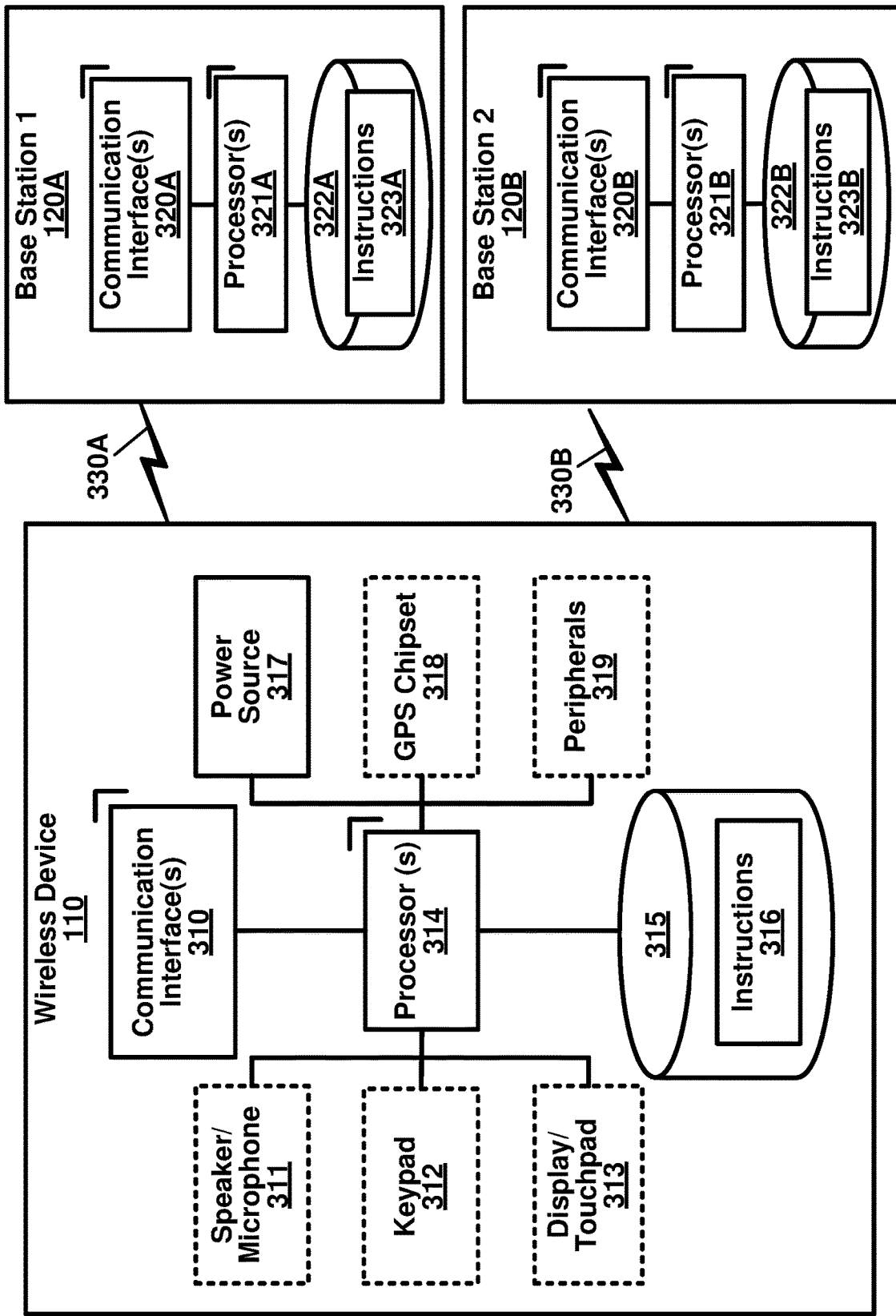
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). An other SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG.

4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
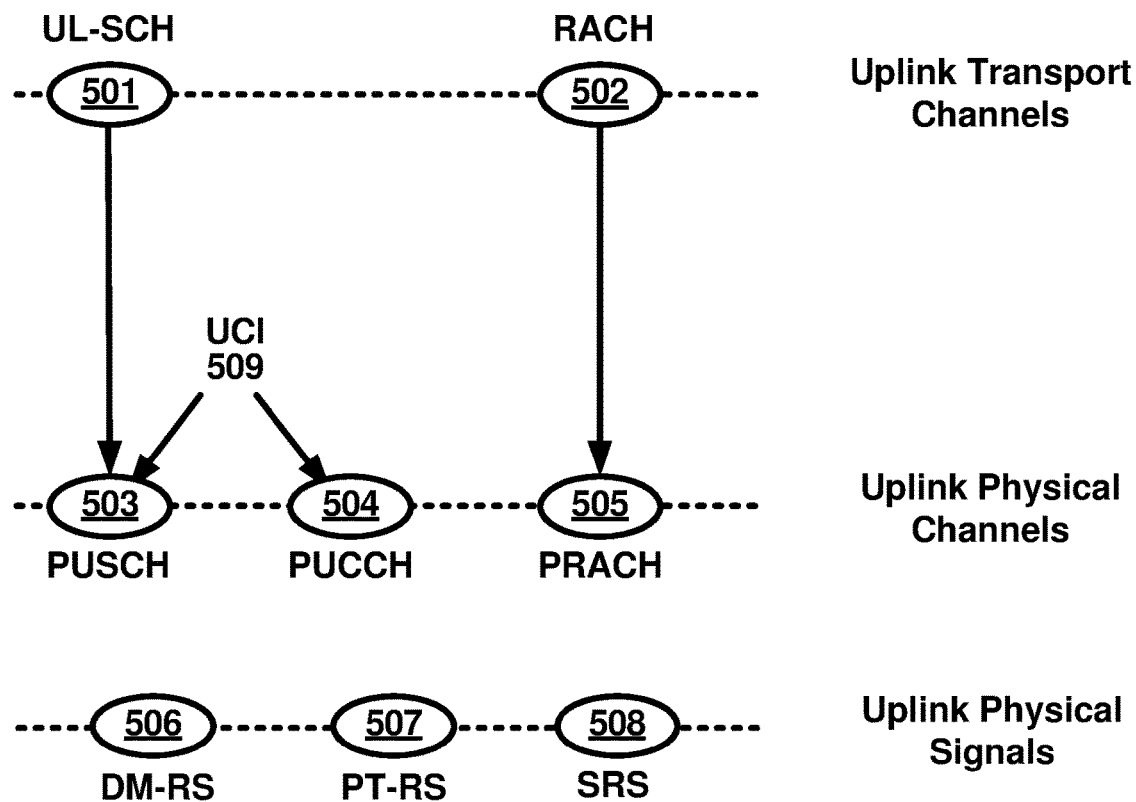
FIG. 5A is a diagram of an example uplink channel mapping and example uplink physical signals as per an aspect of an embodiment of the present disclosure.
Figure 5B:
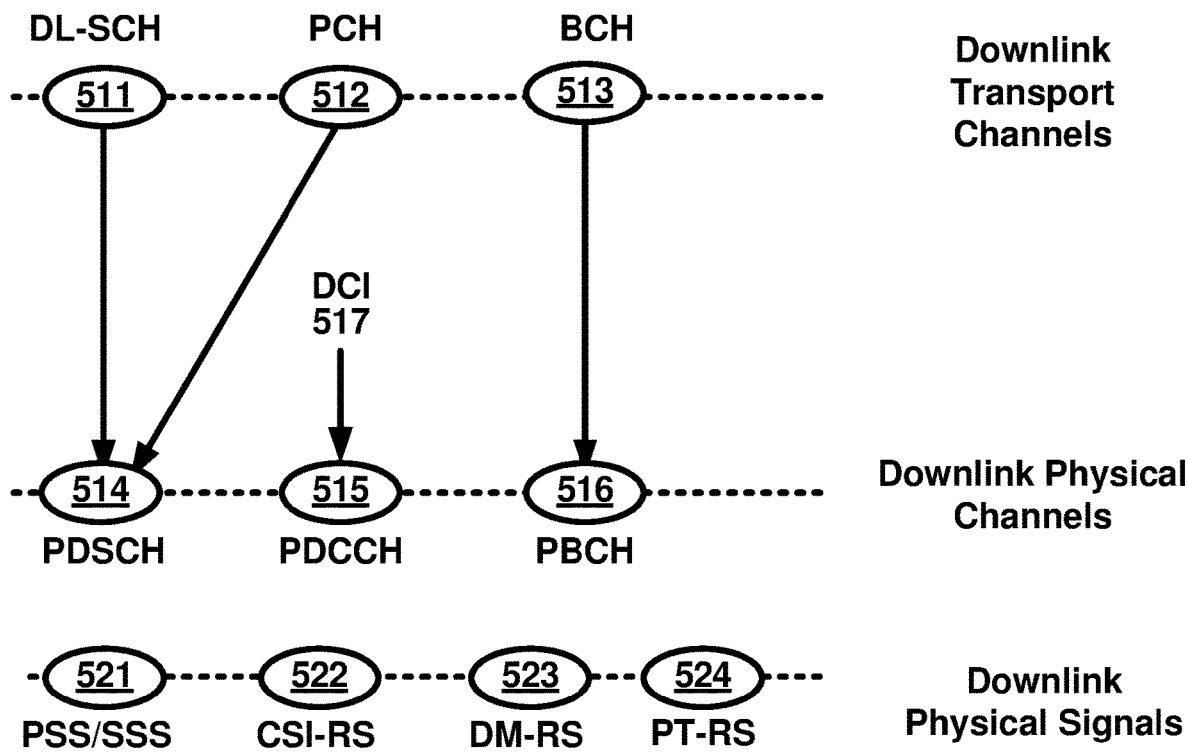
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
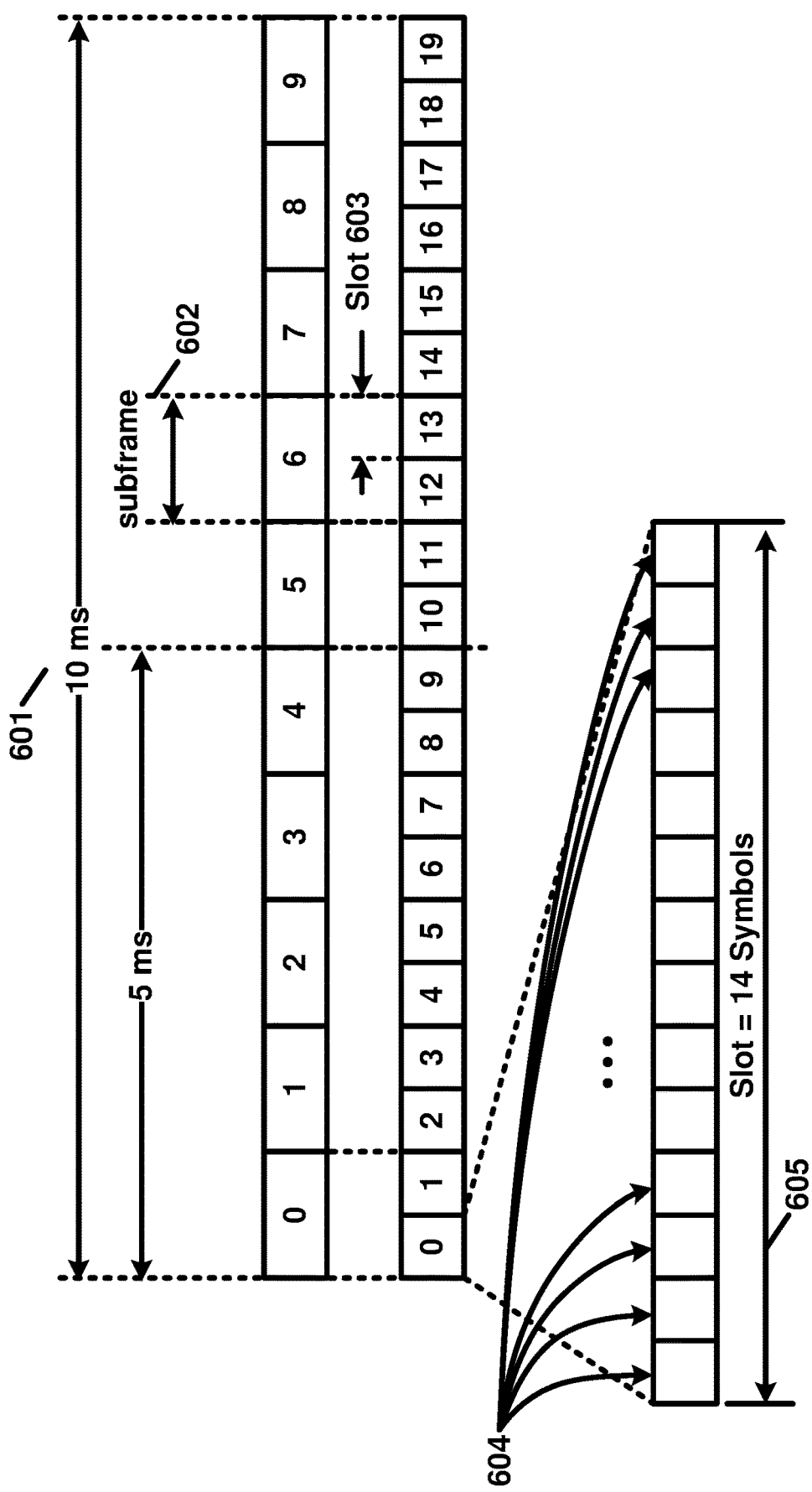
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
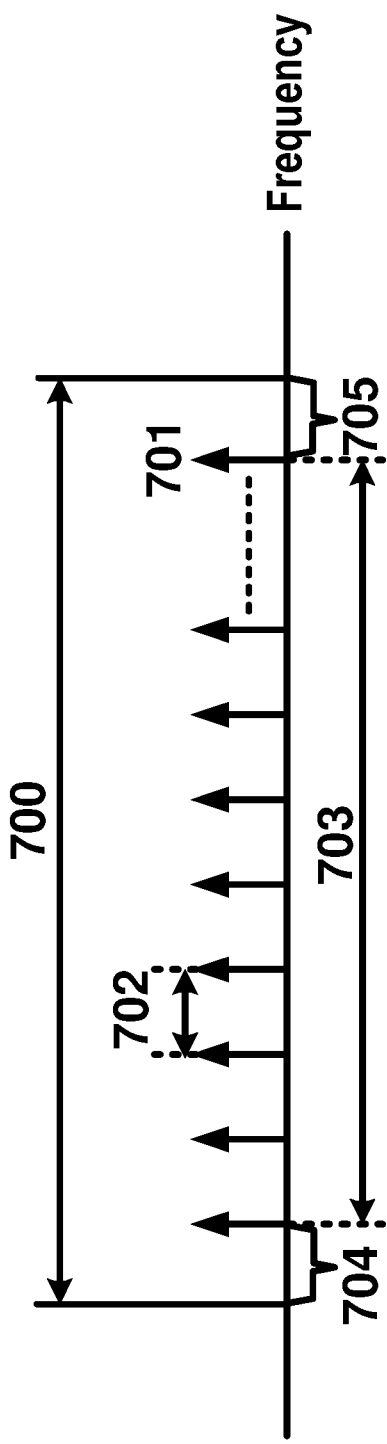
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
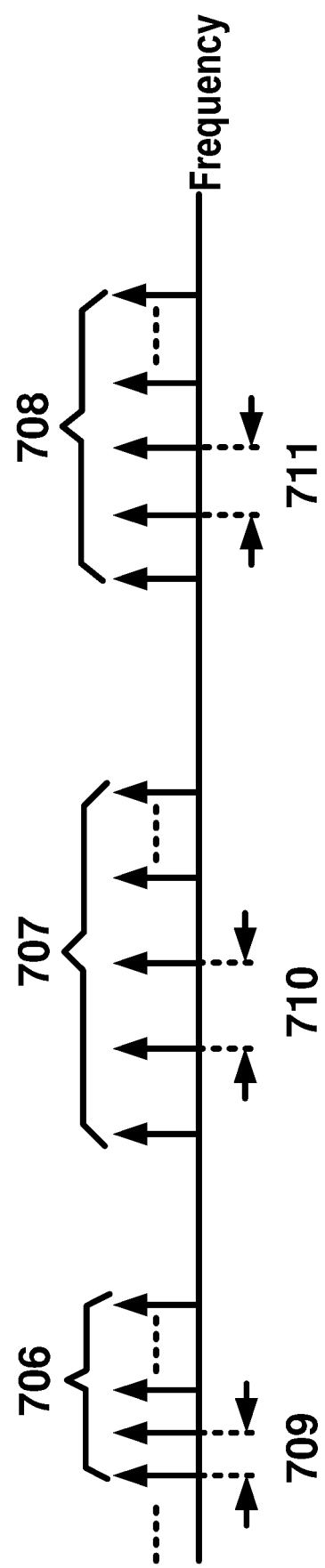

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
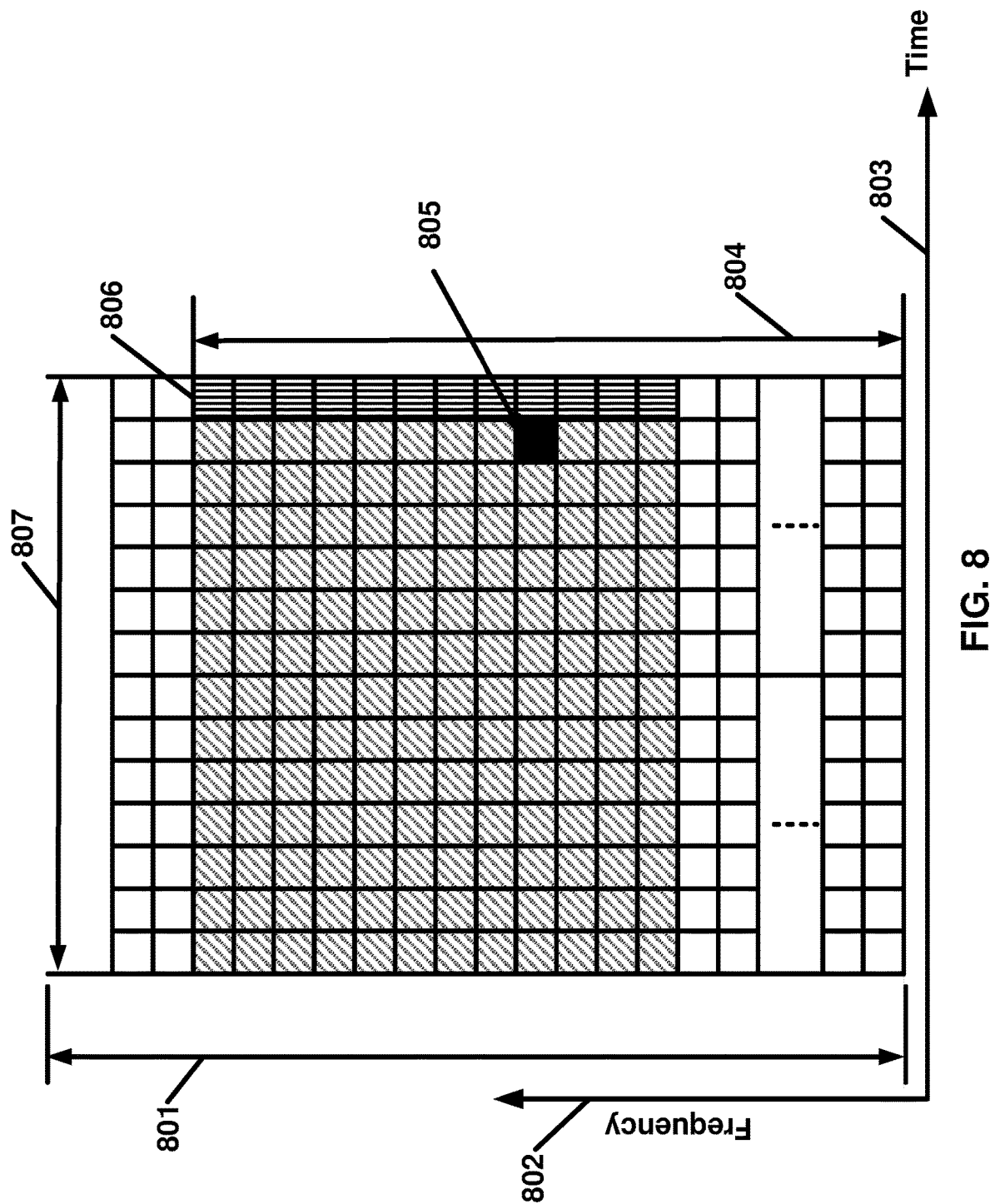
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
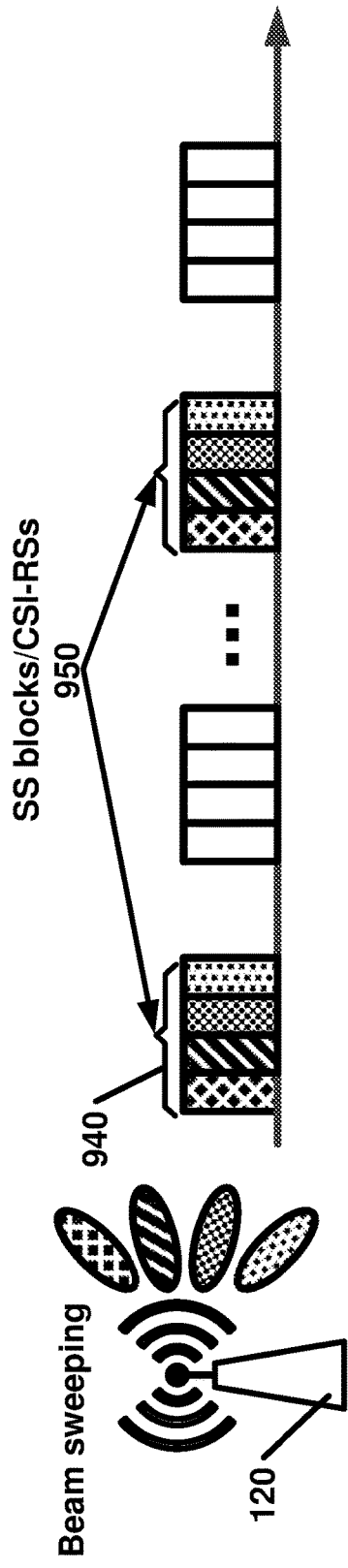
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
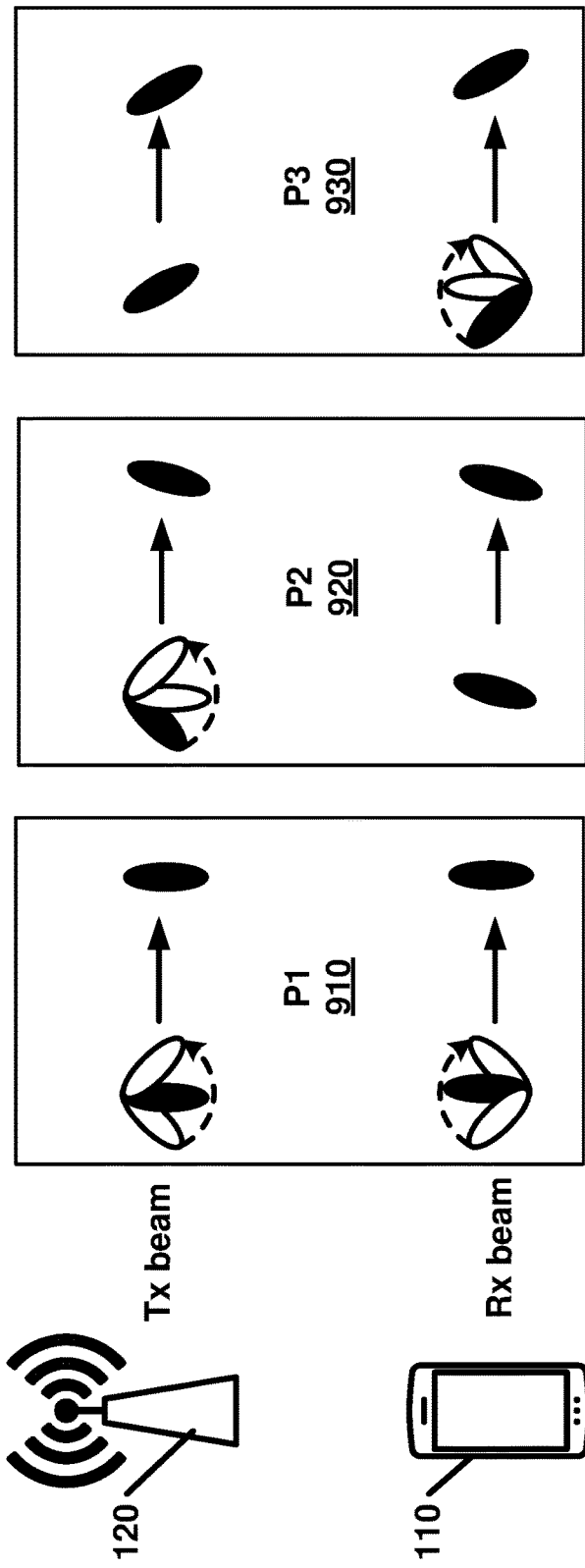
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
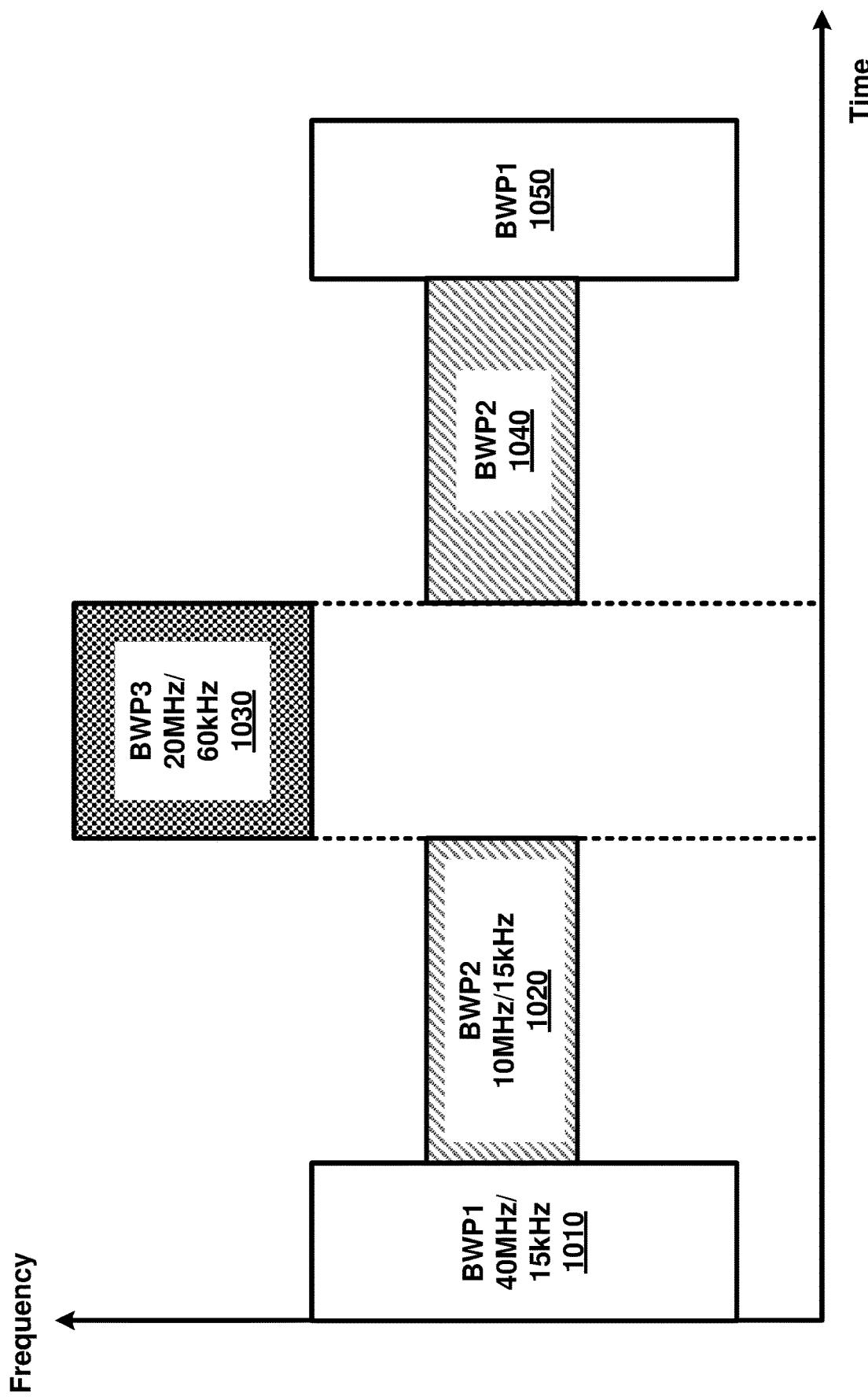
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
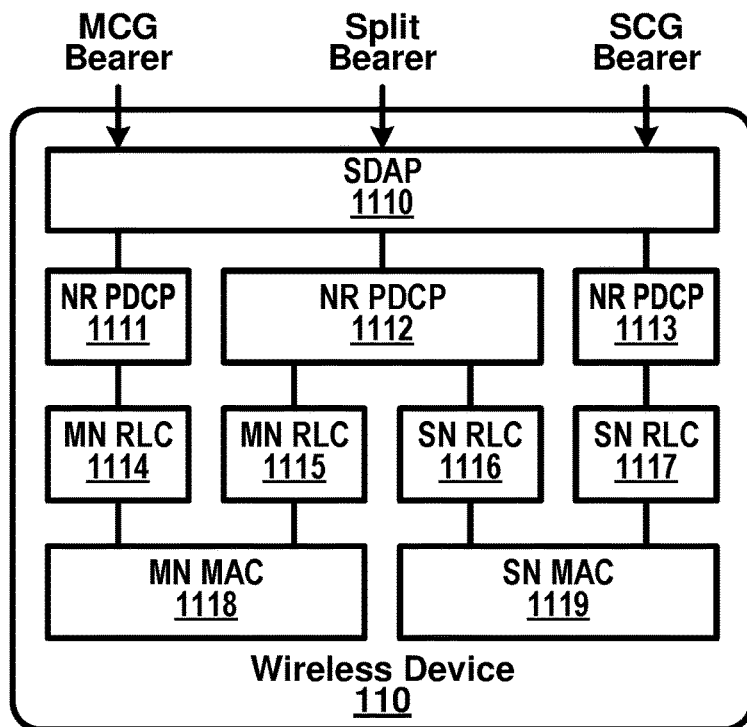
FIG. 11A, and FIG. 11B are diagrams of an example multi connectivity as per an aspect of an embodiment of the present disclosure.
Figure 11B:
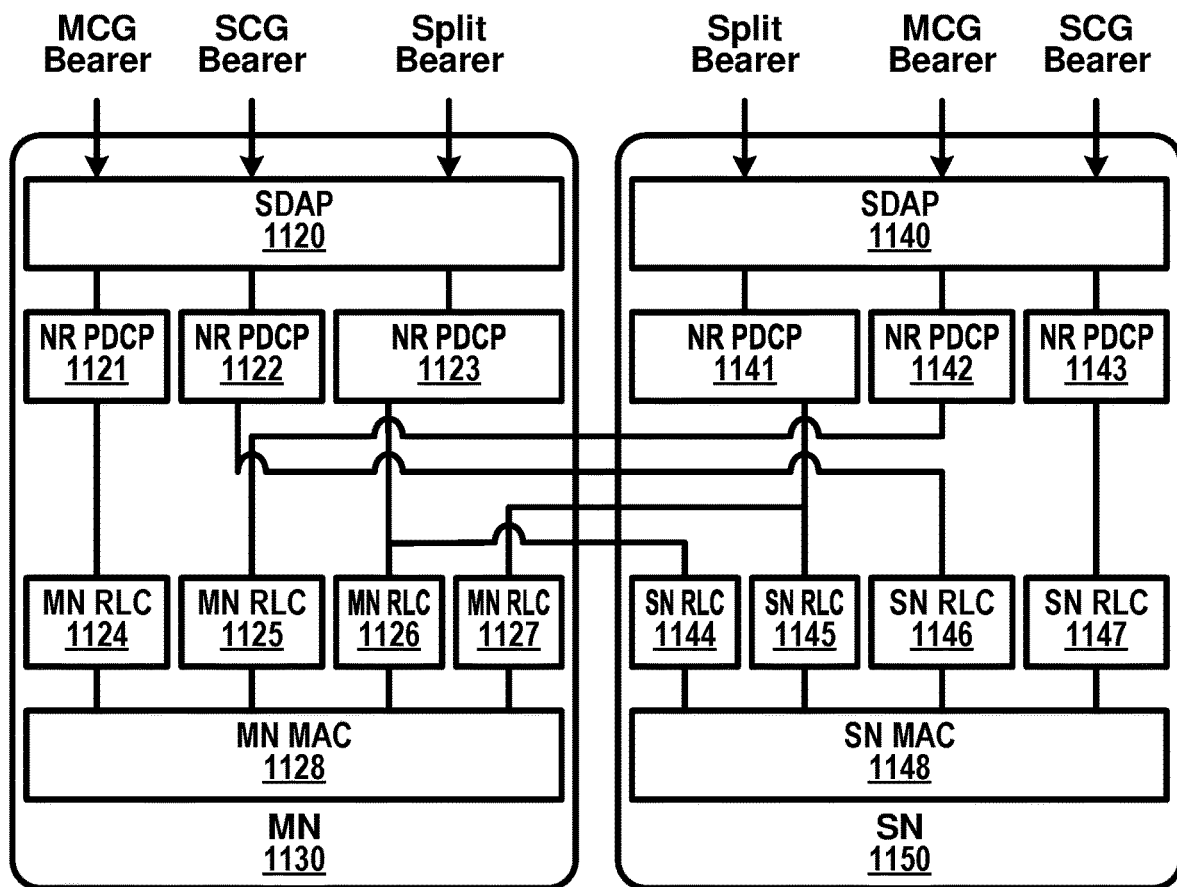

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
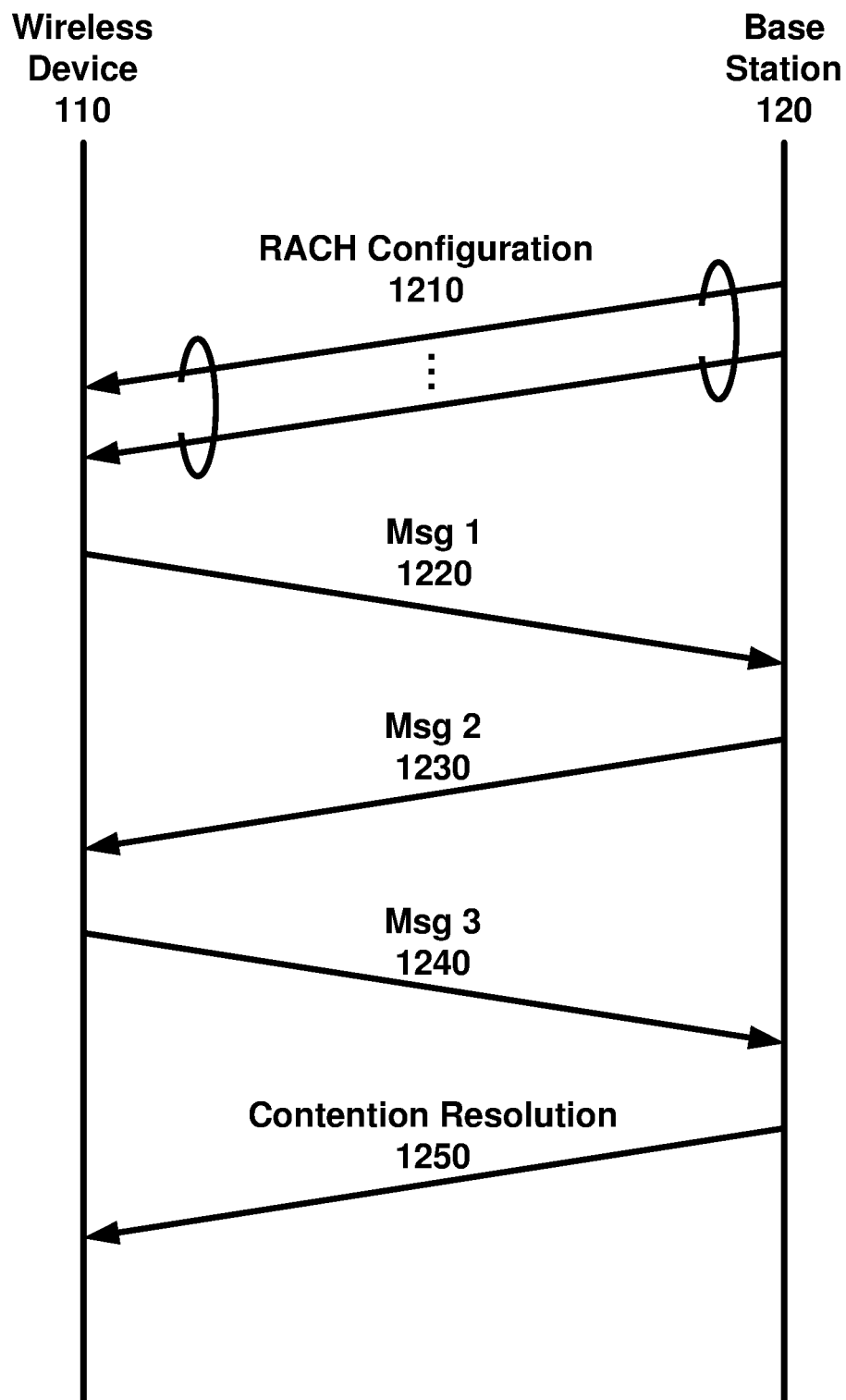
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronised, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
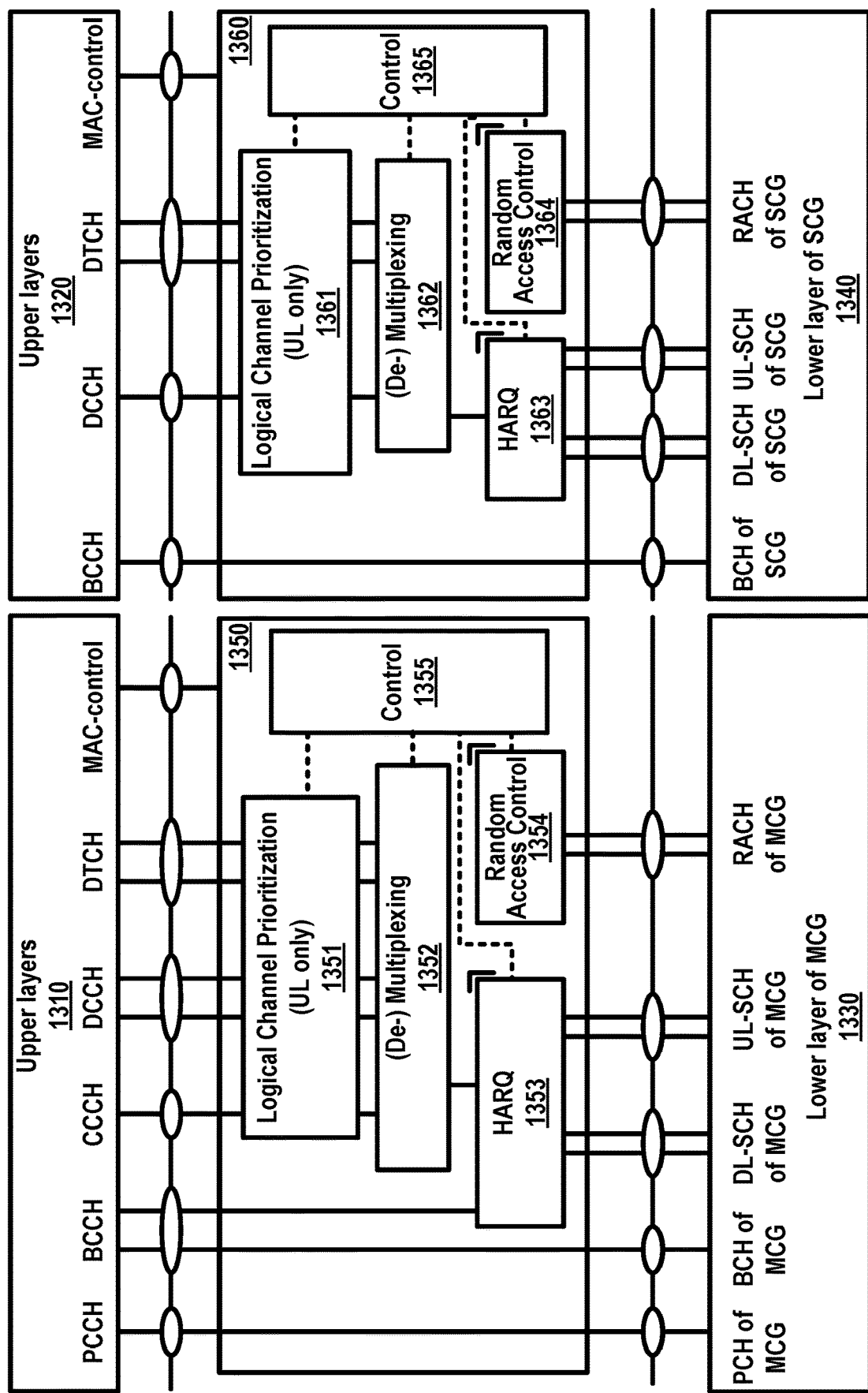
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
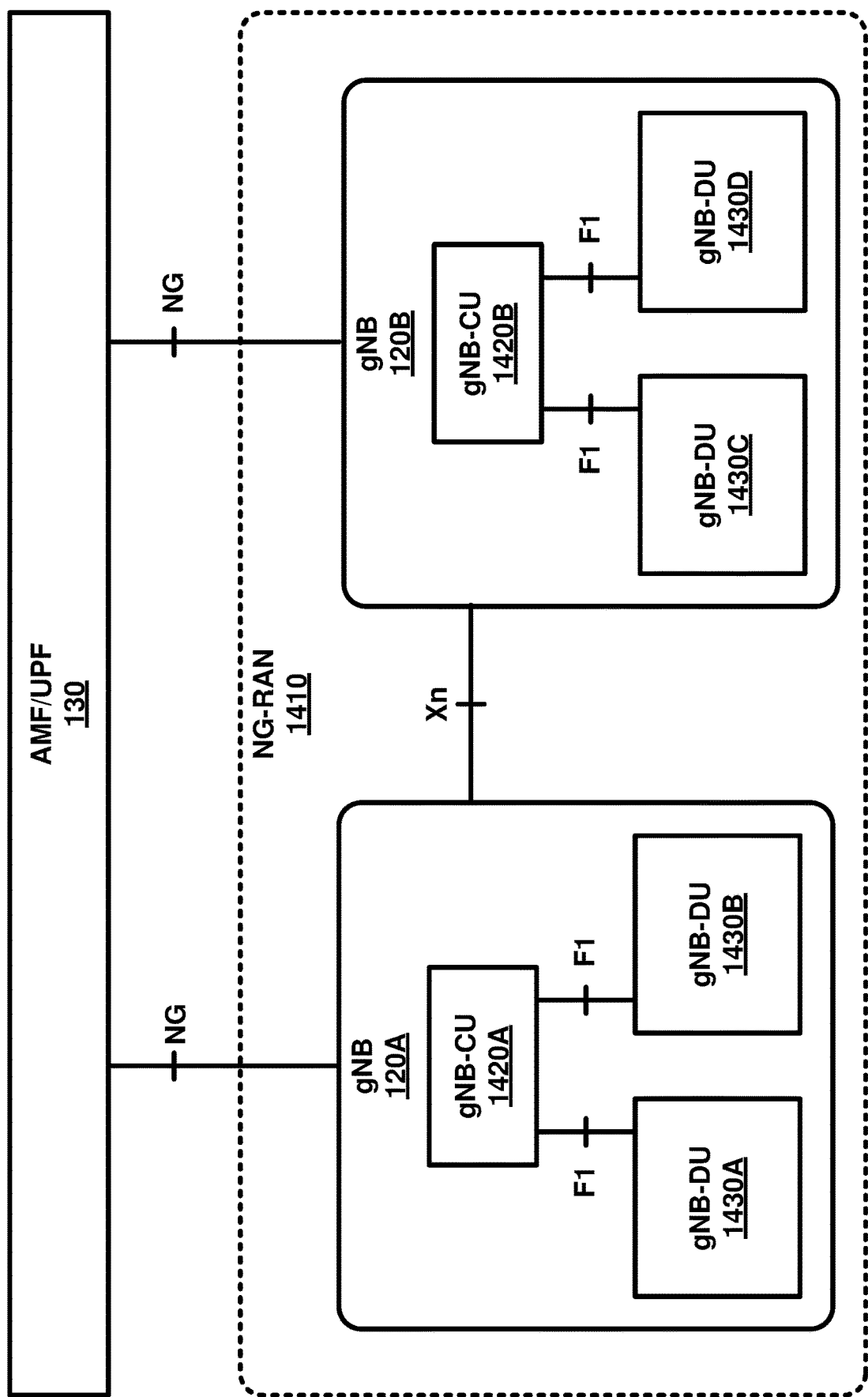
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
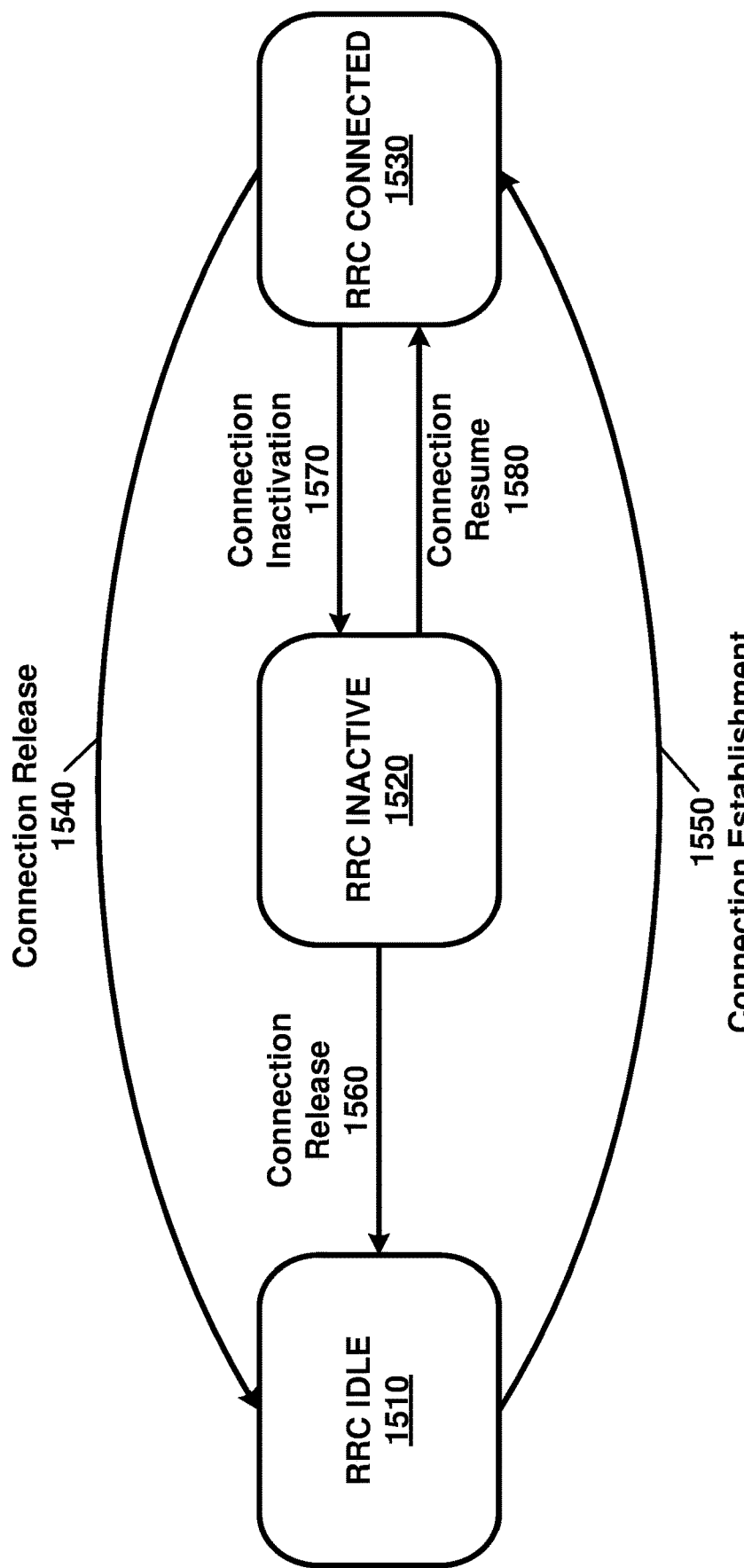
FIG. 15 is a diagram of an aspect of an example embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an implementation of existing technologies, a wireless device may access a cell without a random access procedure (e.g., RACH-less and/or RACH-skip) if the wireless device knows a timing advance (TA) for the cell. A network (e.g., a base station) may provide a TA of a cell (e.g., cell specific TA) for a wireless device, and/or the wireless device may transmit a transport block via a physical uplink shared channel (PUSCH) based on the TA without performing a random access process. If a cell operates with multiple transmission reception points (TRPs) (e.g., reception points), a TA may have a different value depending on which TRP receives signal from a wireless device. In an existing technology, if a wireless device attempts to access a cell configured with multiple TRPs without a random access procedure based on a single TA (e.g., cell specific TA) for the cell, the wireless device may fail in the access attempt depending on a TRP that receives a signal for the access attempt. An access failure caused by an improper TA in RACH-less access procedure (e.g., handover and/or secondary cell group change procedure) may decrease communication reliability and increase service delay. Enhanced signaling mechanisms for RACH-less access of wireless devices are needed.

Embodiments of the present disclosure may provide enhanced signaling mechanisms for wireless devices that access a cell (e.g., for handover and/or secondary cell group change) without a random access procedure. In an example embodiment, a network (e.g., a base station) may provide multiple TAs (e.g., and/or at least one beam/beam-group/TRP/TAG/CORESET/CORESET-group/TCI-state specific TA) for a wireless device that accesses a cell using multiple TRPs. Each of the multiple TAs (e.g., and/or the at least one beam/beam-group/TRP/TAG/CORESET/CORESET-group/TCI-state specific TA) may be associated with one or more beams, a TRP, a timing advance group (TAG), and/or the like. The wireless device may use one of the multiple TAs to access the cell, depending on which downlink beam (e.g., TRP and/or TAG) is selected for the access. Example embodiments may increase communication reliability and decrease service latency.

Figure 16:
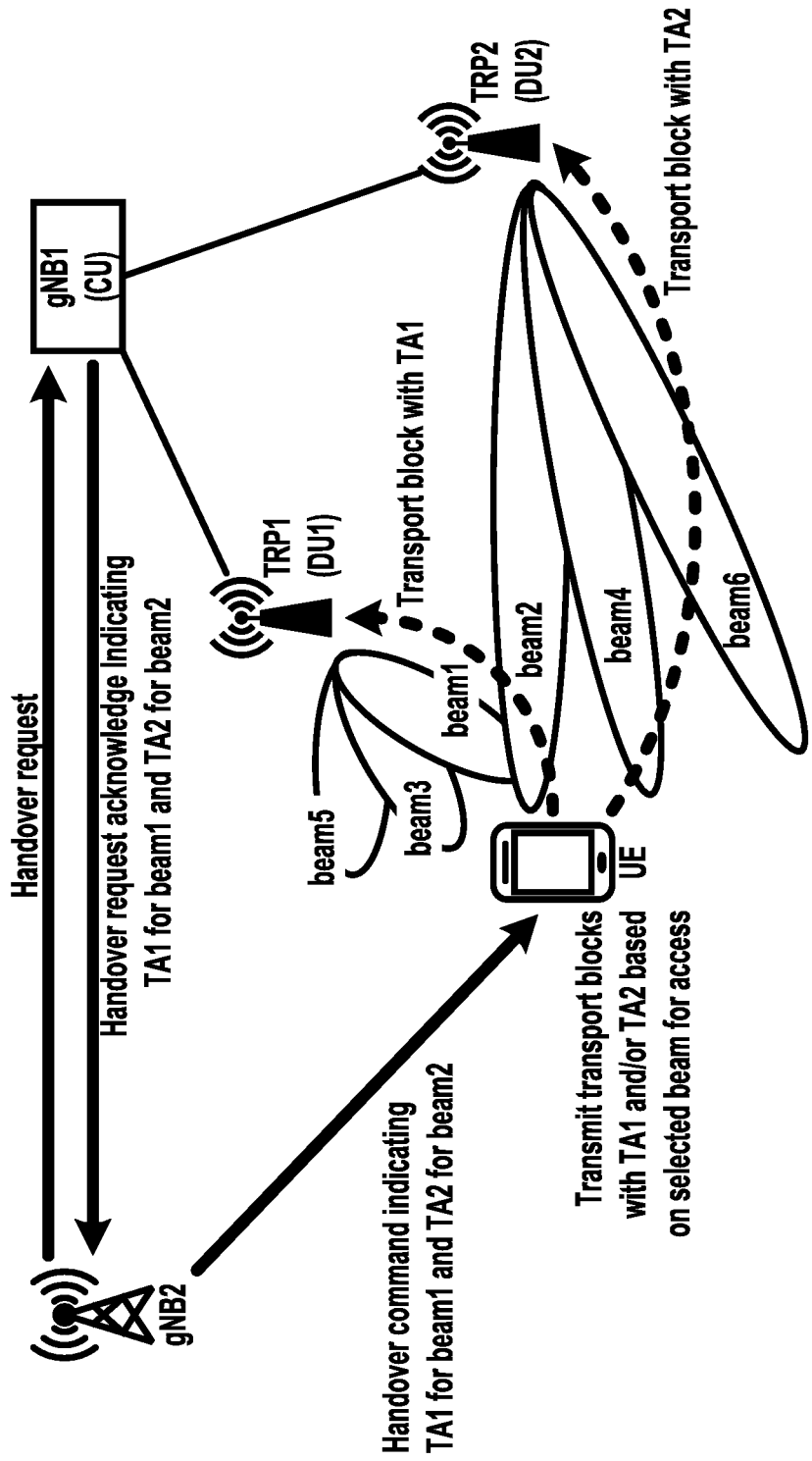
FIG. 16 is a diagram of an aspect of an example embodiment of the present disclosure.
Figure 20:
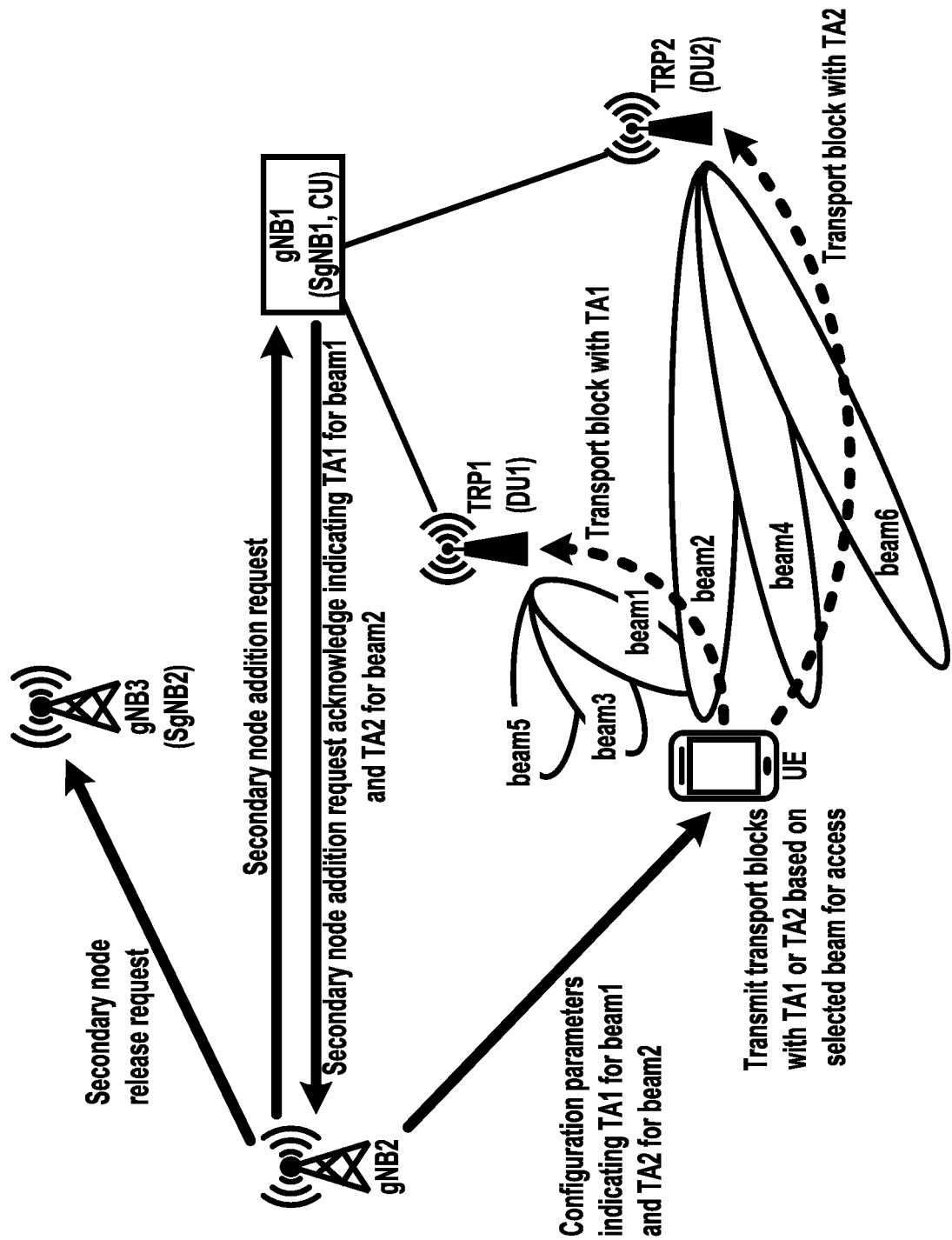
FIG. 20 is a diagram of an aspect of an example embodiment of the present disclosure.
Figure 22:
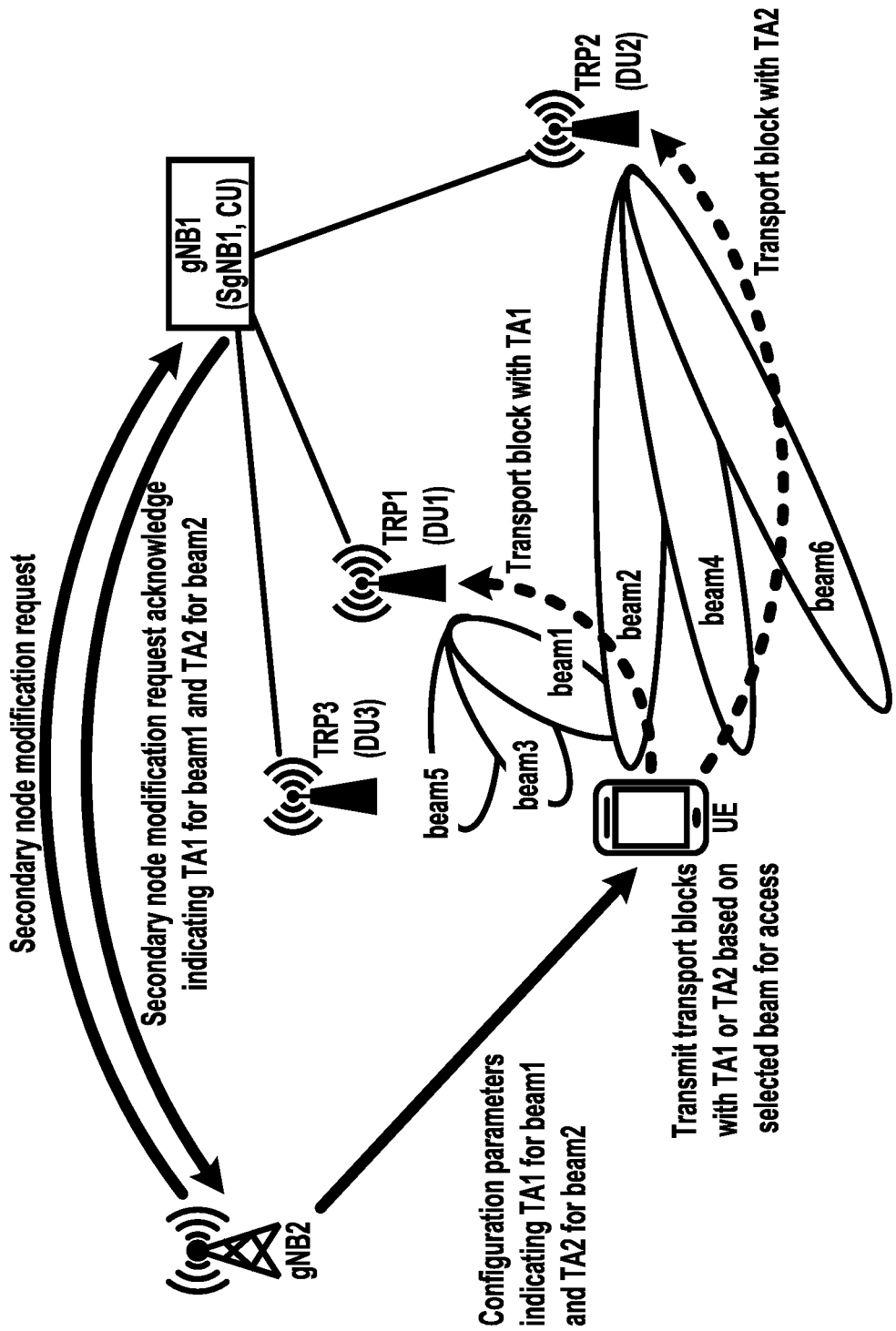
FIG. 22 is a diagram of an aspect of an example embodiment of the present disclosure.

In an example, as shown in FIG. 16, FIG. 20, and/or FIG. 22, a wireless device (e.g., user equipment, UE, device, etc.) may be served by a second base station (e.g., gNB2, gNB, eNB, access node, access network, etc.). The second base station may have a connection with a first base station (e.g., gNB1, gNB, eNB, access node, access network, etc.). The connection may comprise a direct connection (e.g., Xn interface, X2 interface, etc.) and/or an indirect connection (e.g., comprising one or more N2 or S1 interfaces) via one or more core network nodes (e.g., AMF, MME, etc.). The first base station may serve a first cell. The first cell may comprise (e.g., operate based on) a plurality of beams comprising a first beam and/or a second beam. In an example, the first cell may use multiple transmission reception points (TRPs) (e.g., comprising a transmission point (TP) and/or a reception point (RP)) comprising a first TRP and/or a second TRP. A first base station distributed unit (e.g., gNB-DU1, gNB-DU, base station DU, DU, etc.) of the first base station may comprise the first TRP. A second base station distributed unit (e.g., gNB-DU2, gNB-DU, base station DU, DU, etc.) of the first base station may comprise the second TRP. In an example, the first TRP may serve (e.g., transmit) the first beam, and/or the second TRP may serve (e.g., transmit) the second beam. In the present disclosure, the first base station may be interpreted as a base station central unit (e.g., gNB-CU, base station CU, CU, etc.) of the first base station.

Figure 18:
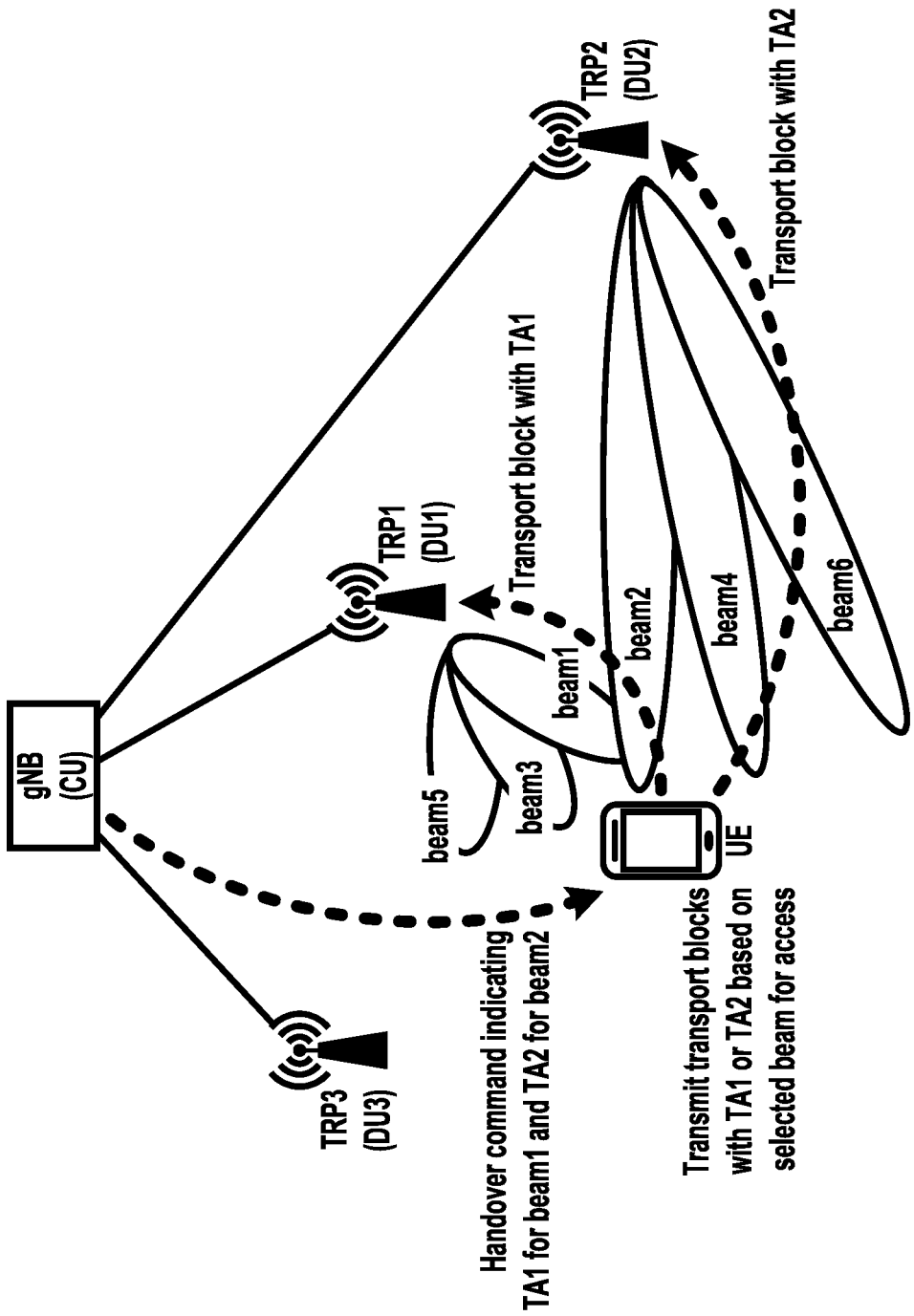
FIG. 18 is a diagram of an aspect of an example embodiment of the present disclosure.

In an example, as shown in FIG. 18, the first base station may be the second base station. In an example, the first base station may be a secondary base station (e.g., SgNB, SeNB, secondary node, S-node, etc.) serving a secondary cell group (SCG) of the wireless device. The second base station may be a master base station (e.g., MgNB, MeNB, master node, M-node, etc.) serving a master cell group (MCG) of the wireless device. By performing a handover to the first cell of the first base station, the wireless device may change/update the first base station from a secondary base station to a master base station.

In an example, a wireless device may receive, from a second base station, a radio resource control message comprising access information for a first cell of a first base station. The access information may indicate a first timing advance associated with a first beam of the first cell. The wireless device may determine/select the first beam to access the first cell. The wireless device may transmit, based on the determining the first beam, transport blocks based on the first timing advance to access the first cell.

In an example, the wireless device may receive, from the second base station, a radio resource control (RRC) message comprising access information for the first cell of the first base station. The access information may indicate a first timing advance (TA) associated with the first beam of the first cell and a second TA associated with the second beam of the first cell. The wireless device may determine one of the first beam and the second beam as a selected beam. The wireless device may select a selected TA (e.g., among the first TA and the second TA) associated with the selected beam. The selected TA may be one of the first TA and the second TA. The wireless device may transmit transport blocks based on the selected TA to access the first cell.

In an example, the first base station may transmit the first beam and the second beam via the first cell. The wireless device may send/transmit, to the second base station, at least one measurement report comprising measurement results of the first cell (e.g., measurement results of the first beam and/or the second beam). The second base station may determine, based on the at least one measurement report, a handover (e.g., or a secondary node addition/modification) of the wireless device to the first cell of the first base station. The second base station may send, to the first base station, a request message for the handover (e.g., or the secondary node addition/modification) of the wireless device. The first base station may determine, based on the request message, access information for the wireless device. The access information may indicate a first TA associated with the first beam of the first cell and a second TA associated with the second beam of the first cell. The first base station may send, to the second base station and in response to the request message, a request acknowledge message (e.g., a handover request acknowledge message or a secondary base station addition/modification request acknowledge message) comprising the access information for the first cell. The second base station may send, to the wireless device, an RRC message (e.g., a handover command or an RRC reconfiguration message) comprising the access information. The wireless device may determine one of the first beam and the second beam as a selected beam. The wireless device may select a selected TA (e.g., among the first TA and the second TA) associated with the selected beam. The selected TA may be one of the first TA and the second TA. The wireless device may transmit transport blocks based on the selected TA to access the first cell.

Figure 17:
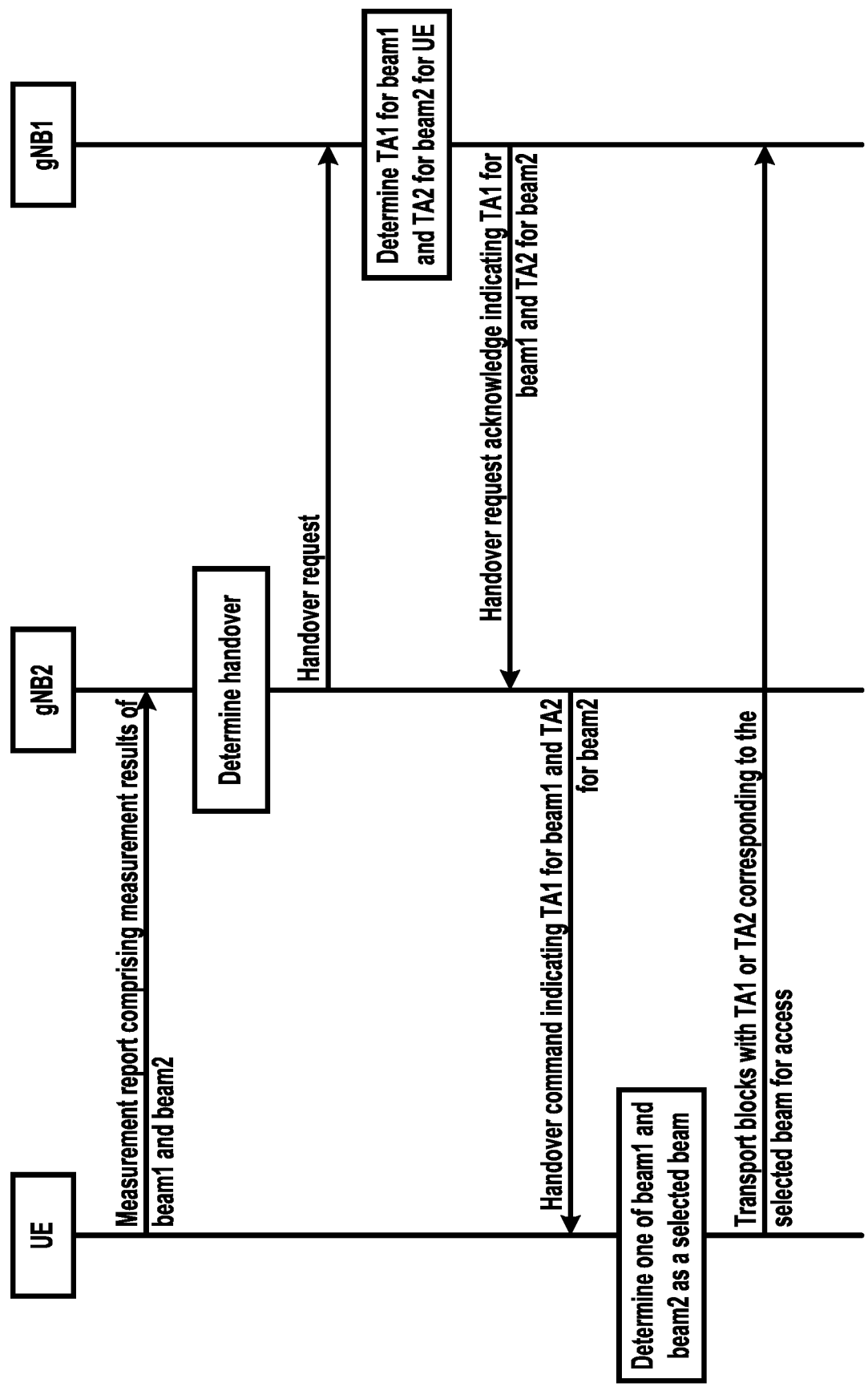
FIG. 17 is a diagram of an aspect of an example embodiment of the present disclosure.
Figure 19:
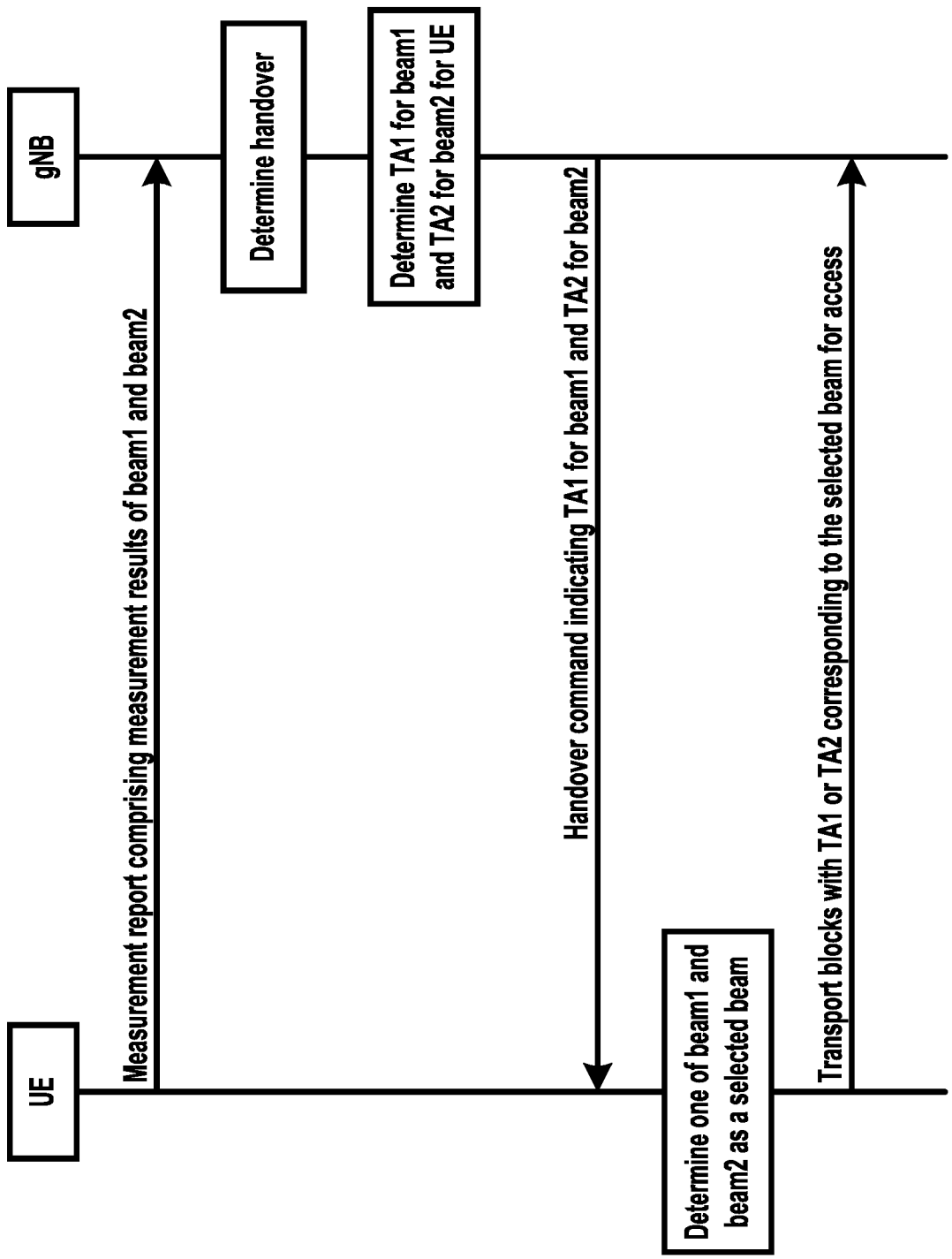
FIG. 19 is a diagram of an aspect of an example embodiment of the present disclosure.
Figure 21:
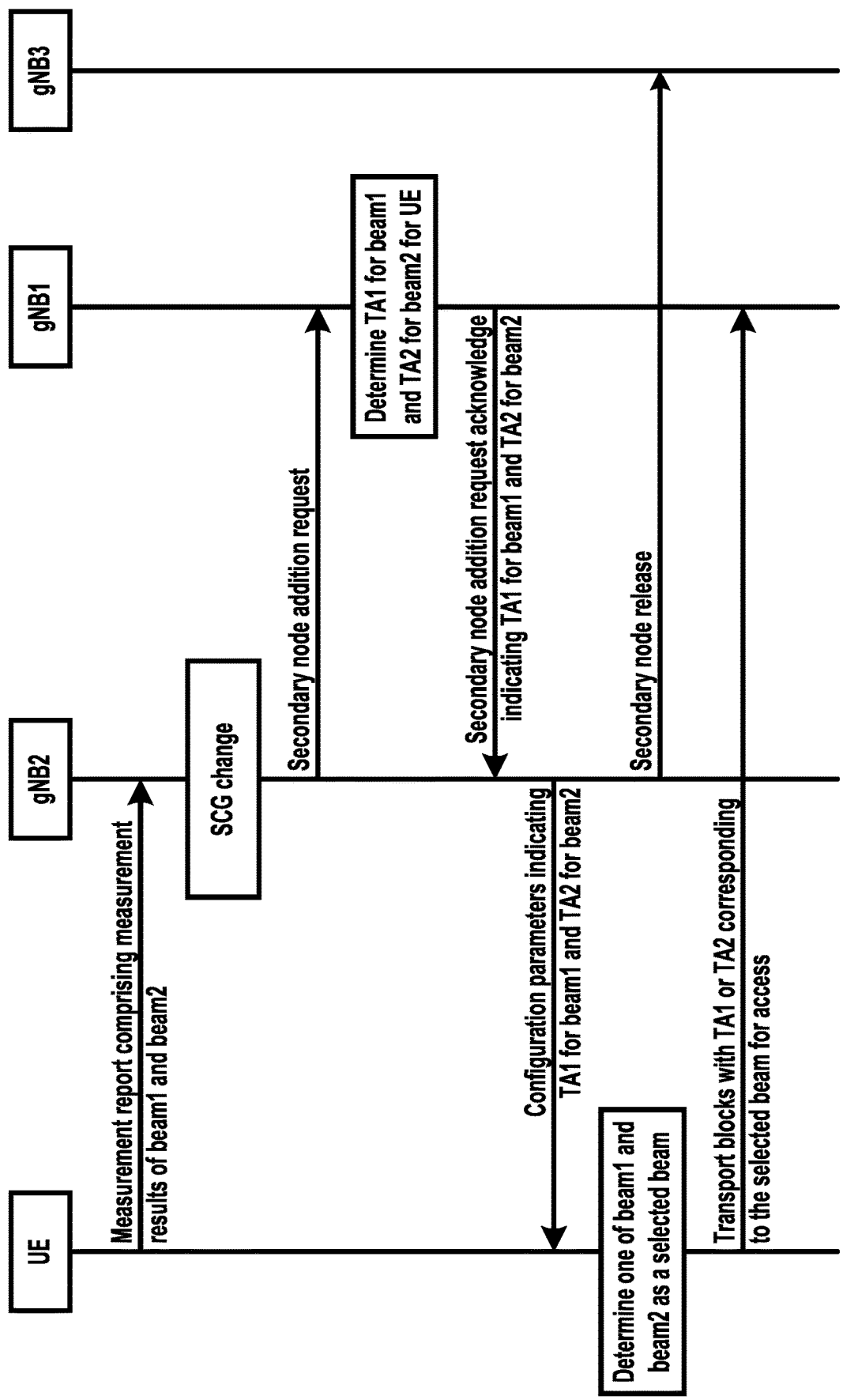
FIG. 21 is a diagram of an aspect of an example embodiment of the present disclosure.
Figure 23:
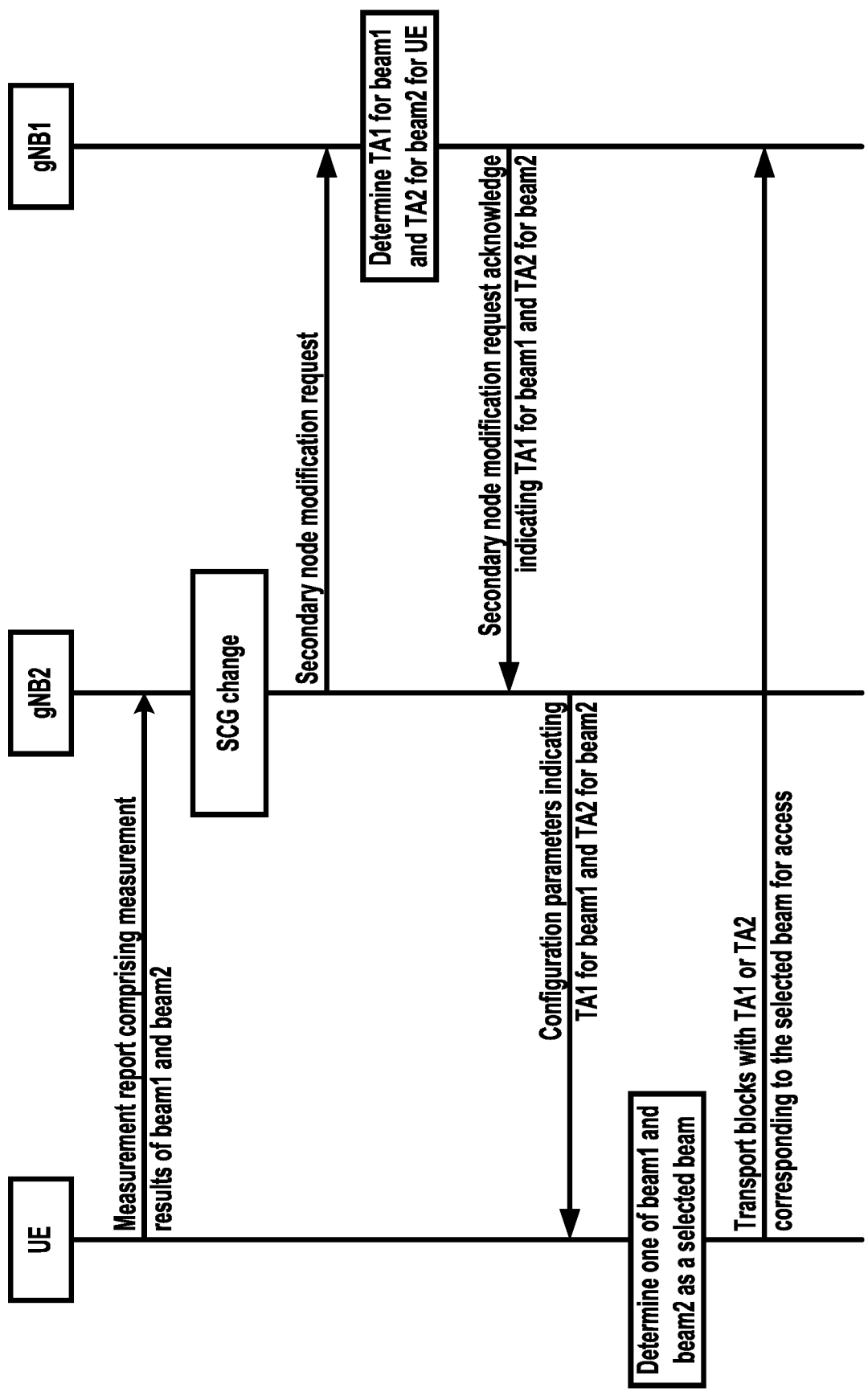
FIG. 23 is a diagram of an aspect of an example embodiment of the present disclosure.

In an example, as shown in FIG. 17, FIG. 19, FIG. 21, and/or FIG. 23, the first base station may transmit the first beam and the second beam via the first cell. In an example, the first cell may comprise the first beam and the second beam. The first beam and/or the second beam may be associated with at least one of: a channel state information-reference signal (CSI-RS); a synchronization signal (SS); a reference signal, and/or the like. In an example, the first beam may be transmitted by the first TRP. The second beam may be transmitted by the second TRP. In an example, the first beam may be transmitted by the first base station distributed unit of the first base station. The second beam may be transmitted by the second base station distributed unit of the first base station.

In an example, the wireless device may receive, from the first base station, at least one of: the first beam (e.g., SS or CSI-RS); the second beam (e.g., SS or CSI-RS); the at least one third beam; and/or the like. The wireless device may receive, from the second base station, a measurement configuration (e.g., meas-Config, via an RRC reconfiguration message) comprising beam configuration parameters (e.g., beam transmission timing, frequency, periodicity, etc.) of the first beam and/or the second beam. The wireless device may receive, based on the measurement configuration, a SS and/or a CSI-RS associated with the first beam and/or receive a SS and/or a CSI-RS associated with the second beam. The wireless device may measure a received quality and/or a received power of the first beam, the second beam, the at least one third beam; and/or the like.

In an example, the wireless device may send/transmit, to the second base station, at least one measurement report comprising measurement results of the first cell (e.g., measurement results of the first beam and/or the second beam). In an example, the wireless device may send/transmit the at least one measurement report based on the receiving the first beam (e.g., SS or CSI-RS) and/or the second beam (e.g., SS or CSI-RS). The measurement results may comprise at least one of: a first received power (e.g., first RSRP) of the first beam (e.g., SS or CSI-RS); a first received quality (e.g., first RSRQ) of the first beam (e.g., SS or CSI-RS); a second received power (e.g., second RSRP) of the second beam (e.g., SS or CSI-RS); a second received quality (e.g., second RSRQ) of the second beam (e.g., SS or CSI-RS); a third received power of the at least one third beam (e.g., SS or CSI-RS); a third received quality of the at least one third beam (e.g., SS or CSI-RS); and/or the like. The measurement results may comprise a combined RSRP and/or a combined RSRQ (e.g., layer 3 measurement result) of one or more beams (e.g., the first beam and/or the second beam) of the first cell. The combined RSRP may be an RSRP of the first cell. The combined RSRQ may be an RSRQ of the first cell. The measurement results may comprise one or more RSRPs and/or one or more RSRQs of one or more cells of the first base station and/or the second base station. In an example, the at least one measurement report may comprise an RRC layer message.

In an example, the second base station may determine, based on the at least one measurement report, a radio resource configuration initiation (e.g., a handover or a secondary node addition/modification) of the first cell of the first base station for the wireless device. The radio resource configuration initiation may be at least one of: the handover of the wireless device to the first cell; the secondary node addition/modification (e.g., secondary node addition or secondary node modification) for the wireless device with the first base station (e.g., configuring the first cell as a secondary cell group (SCG): a primary secondary cell (PScell) and/or a secondary cell (Scell) of the wireless device); and/or the like. The secondary node addition/modification procedure may be and/or may be part of an SCG change procedure.

In an example, the second base station may determine, based on the at least one measurement report, the handover of the wireless device to the first cell. In an example, the second base station may determine, based on the at least one measurement report, a secondary node configuration (e.g., the secondary node addition/modification) for the wireless device. The secondary node configuration may comprise configuring the first cell as an SCG for the wireless device.

In an example, based on determining the radio resource configuration initiation, the second base station may send, to the first base station, a request message for the radio resource configuration initiation (e.g., the handover or the secondary node addition/modification) of the wireless device. The request message may be a handover request message for the handover of the wireless device. The request message may be, for the secondary node addition/modification of the wireless device, at least one of: a secondary node addition request message (e.g., S-node addition request message, SeNB addition request message, etc.); a secondary node modification request message (e.g., S-node modification request message, SeNB modification request message, etc.); and/or the like. In an example, the second base station may send, to the first base station, the handover request message for the handover of the wireless device. In an example, the second base station may send, to the first base station, a configuration request message (e.g., the secondary node addition request message or the secondary node modification request message) for the secondary node configuration (e.g., the secondary node addition/modification) for the wireless device.

In an example, the second base station may send the request message to the first base station via the direct interface (e.g., the Xn interface and/or the X2 interface) between the first base station and the second base station. In an example, the second base station may send indication of the request of the radio resource configuration initiation (e.g., the handover or the secondary node addition/modification) via the indirect connection (e.g., comprising the one or more N2 or S1 interfaces) through the one or more core network nodes (e.g., AMF, MME, etc.). In an example, the second base station may send, to the AMF, a handover required message for the handover of the wireless device, and/or the AMF may send, to the first base station and based on the handover required message, an S1/N2 handover request message for the handover of the wireless device.

In an example, the request message may comprise the measurement results of the at least one measurement report. The request message may comprise at least one of: a UE identifier of the wireless device; a cell identifier (e.g., physical cell identifier, PCI, cell global identifier, CGI, etc.) of the first cell (e.g., target cell); security capability information and/or security information of the wireless device; PDU session information (e.g., PDU session list, QoS flow list, QoS, S-NSSAI, NSSAI, etc.) of the wireless device; RRC contexts (e.g., RRC configuration parameters; e.g., recommended RRC configuration parameters) of the wireless device; and/or the like.

In an example, the first base station may determine, based on the request message, access information for the wireless device to access the first cell. The access information may indicate a TA for at least one of: one or more beams, a TRP, a TAG, a CORESET, a CORESET group, at least one TCI state, at least one QCL, at least one QCL type, and/or the like. The access information may be for the wireless device to access the first cell. The access information may indicate a first TA associated with the first beam (e.g., and/or first TRP, first TAG, first CORESET(s), first TCI-state(s), first QCL-type, etc.) of the first cell and/or a second TA associated with the second beam (e.g., and/or second TRP, second TAG, second CORESET(s), second TCI-state(s), second QCL-type, etc.) of the first cell. In an example, the first TA may be different than the second TA. The wireless device may use at least one of the first TA and/or the second TA to access the first cell for the handover and/or the secondary base station addition/modification.

In an example, the first TA and/or the second TA may comprise at least one of: a zero TA (e.g., TA=0); a TA of a primary timing advance group (TAG) of a master cell group (MCG) of the wireless device; a TA of a secondary TAG of a master cell group (MCG) of the wireless device; a TA of a primary TAG of a secondary cell group (SCG) of the wireless device; a TA of a secondary TAG of a secondary cell group (SCG) of the wireless device; and/or the like.

In an example, the access information may indicate, for the first TA and/or the second TA, at least one of: a TA is zero (e.g., ta0); a primary TAG of an MCG; a secondary TAG (e.g., a TAG identifier of the secondary TAG) of an MCG; a primary TAG of an SCG; and/or a secondary TAG (e.g., a TAG identifier of the secondary TAG) of an SCG. In an example, the primary TAG of the MCG (e.g., mcg-PTAG) in the access information may indicate that the first TA and/or the second TA is same (e.g., close) to a TA of the primary TAG of the MCG that the wireless device is configured with at the time of the radio resource configuration initiation. In an example, the secondary TAG of the MCG (e.g., mcg-STAG) in the access information may indicate that the first TA and/or the second TA is same (e.g., close) to a TA of the secondary TAG of the MCG that the wireless device is configured with at the time of the radio resource configuration initiation. The secondary TAG of the MCG may further indicate a secondary TAG identifier indicating at least one of one or more secondary TAGs of the MCG of the wireless device. In an example, the primary TAG of the SCG (e.g., scg-PTAG) in the access information may indicate that the first TA and/or the second TA is same (e.g., close) to a TA of the primary TAG of the SCG that the wireless device is configured with at the time of the radio resource configuration initiation. In an example, the secondary TAG of the SCG (e.g., scg-STAG) in the access information may indicate that the first TA and/or the second TA is same (e.g., close) to a TA of the secondary TAG of the SCG that the wireless device is configured with at the time of the radio resource configuration initiation. The secondary TAG of the SCG may further indicate a secondary TAG identifier indicating at least one of one or more secondary TAGs of the SCG of the wireless device. In an example implementation, the access information may indicate that a TA of the first TA is zero and that a TA of the second TA is same to the primary TAG of the SCG. In an example, the access information may comprise at least one of: a first value (e.g., integer value 0, . . . , 63; e.g., 6 bits) of the first TA; and/or a second value (e.g., integer value 0, . . . , 63; e.g., 6 bits) of the second TA. FIG. 26 shows an example information element of the access information indicating the first TA and/or the second TA.

In an example, the access information may comprise first fields for first resources associated with the first beam. The first fields may comprise at least one of: a first number of configured hybrid automatic repeat request (HARQ) processes (e.g., numberOfConfUL-Processes); a first uplink grant (e.g., ul-Grant); a first uplink scheduling interval (e.g., ul-SchedInterval); a first uplink starting subframe/slot/symbol (e.g., ul-StartSubframe, ul-Slot, ul-Symbol, etc.); and/or the like. In an example, the access information may comprise second fields for second resources associated with the second beam. The second fields may comprise at least one of: a second number of configured HARQ processes (e.g., numberOfConfUL-Processes); a second uplink grant (e.g., ul-Grant); a second uplink scheduling interval (e.g., ul-SchedInterval); a second uplink starting subframe/slot/symbol (e.g., ul-StartSubframe, ul-Slot, ul-Symbol, etc.); and/or the like. In an example, the wireless device may transmit transport blocks via the first resources or the second resources associated with a selected beam (e.g., the first beam or the second beam) to access the first cell. FIG. 26 shows an example information element of the access information indicating the first resources associated with the first beam (e.g., and/or first TRP, first TAG, first CORESET(s), first TCI-state(s), first QCL-type, etc.) and/or the second resources associated with the second beam (e.g., and/or second TRP, second TAG, second CORESET(s), second TCI-state(s), second QCL-type, etc.). In an example, the access information may indicate that the first TA is associated with the first resources (e.g., indicate that the wireless device may need to apply the first TA when the wireless device uses the first resources for transmission of transport blocks to access the first cell). In an example, the access information may indicate that the second TA is associated with the second resources (e.g., indicate that the wireless device may need to apply the second TA when the wireless device uses the second resources for transmission of transport blocks to access the first cell).

In an example, the first and/or second number of configured HARQ processes (e.g., numberOfConfUL-Processes) may be a number of configured HARQ processes for pre-allocated uplink grant for the wireless device (e.g., when the wireless device is configured with asynchronous HARQ). In an example, the first and/or second uplink grant (e.g., ul-Grant) may indicate resources of a target PCell/PSCell (e.g., the first cell) to be used for uplink transmission of PUSCH (e.g., transport blocks). In an example, the first and/or second uplink scheduling interval (e.g., ul-SchedInterval) may indicate a scheduling interval in uplink, and/or may indicate a number of subframes/slots/symbols. Value sf2 may corresponds to 2 subframes, sf5 may correspond to 5 subframes, slot2 may corresponds to 2 slots, symbol2 may corresponds to 2 symbols (e.g., OFDM symbols), and/or the like. In an example, the first and/or second uplink starting subframe/slot/symbol (e.g., ul-StartSubframe, ul-Slot, ul-Symbol, etc.) may indicate a subframe/slot/symbol in which the wireless device may initiate an uplink transmission (e.g., transmission of transport blocks of PUSCH). Value 0 may correspond to subframe/slot/symbol number 0, 1 may correspond to subframe/slot/symbol number 1, and/or the like. A subframe/slot/symbol indicating a valid uplink grant according to calculation/determination of UL grant configured by ul-StartSubframe/Slot/Symbol and/or ul-SchedInterval/may be the same across radio frames.

In an example, as shown in FIG. 26, the access information may comprise at least one of: a beam index of the first beam (e.g., at least one SSB-Index, at least one CSI-RS-Index); an identifier of a first TRP (e.g., TRP-Index) associated with the first beam and/or the first TA; a group identifier of a first CORESET group (e.g., CORESET-Id and/or CORESET-Group-Id) associated with the first TRP and/or the first TA; an identifier of a first TCI state (e.g., at least one TCI-StateId) associated with the first TRP and/or the first TA; a first QCL type associated with the first TRP and/or the first TA; and/or the like. In an example, the access information may comprise at least one of: a beam index of the second beam (e.g., at least one SSB-Index, at least one CSI-RS-Index); an identifier of a second TRP (e.g., TRP-Index) associated with the second beam and/or the second TA; a group identifier of a second CORESET group (e.g., CORESET-Id and/or CORESET-Group-Id) associated with the second TRP and/or the second TA; an identifier of a second TCI state (e.g., at least one TCI-StateId) associated with the second TRP and/or the second TA; a second QCL type associated with the second TRP and/or the second TA; and/or the like.

In an example, the access information may comprise at least one of: an identifier of a first TAG (e.g., PTAG, STAG-ID: STAG1, STAG2, STAG3, STAG4, . . . ) associated with the first beam and/or the first TA; and/or an identifier of a second TAG (e.g., PTAG, STAG-ID: STAG1, STAG2, STAG3, STAG4, . . . ) associated with the second beam and/or the second TA. In an example, the first TAG and/or the second TAG may be a TAG when the when the first base station serves the wireless device and/or when/after the radio resource configuration initiation (e.g., the handover or the secondary node addition/modification) of the wireless device for the first cell is completed. In an example, the first TAG and/or the second TAG may be configured based on at least one of: one or more cells; one or more TRPs; one or more beams (e.g., SSB, CSI-RS beam); one or more CORESET groups; one or more TCI states; and/or the like.

Figure 27:
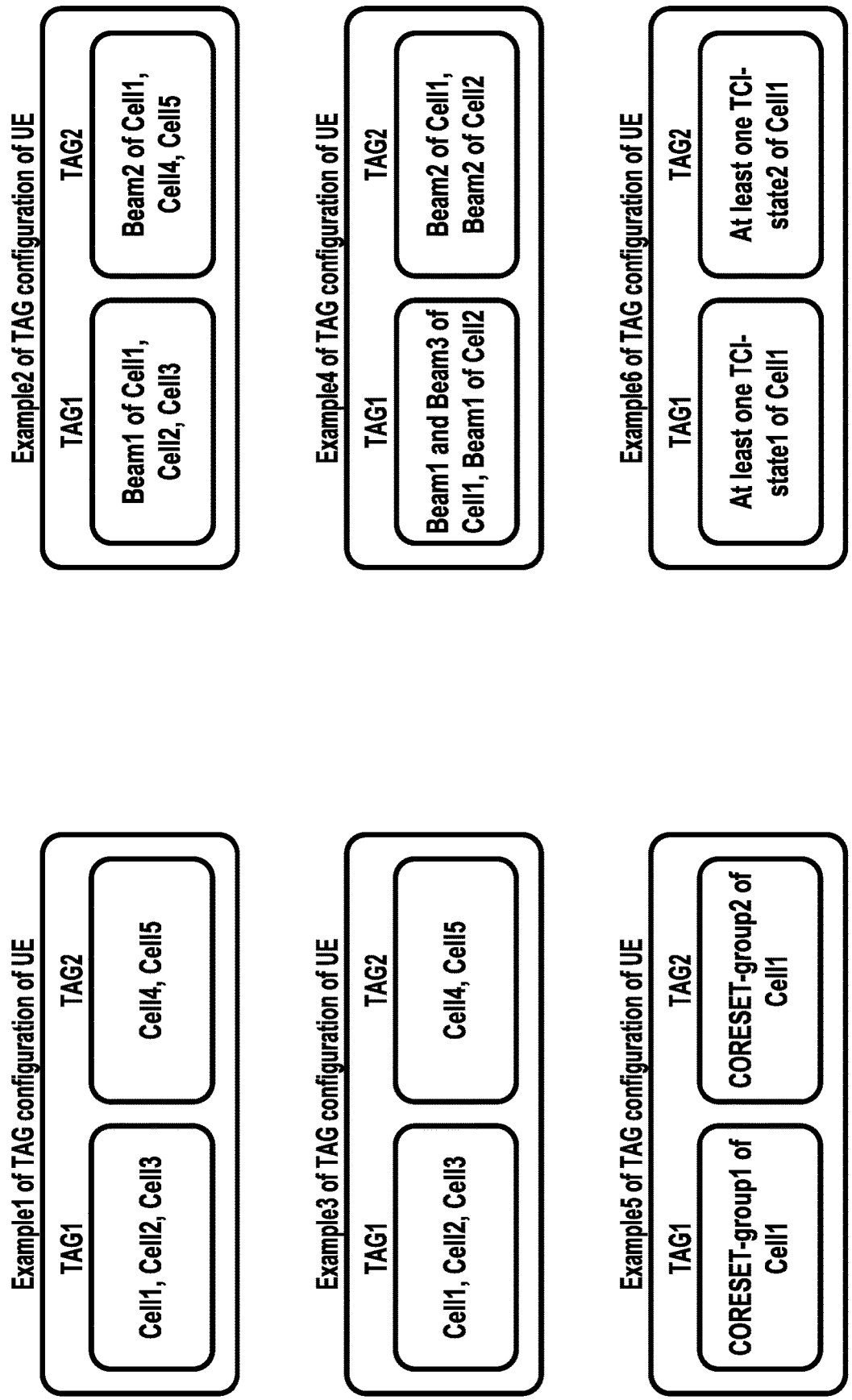
FIG. 27 is a diagram of an aspect of an example embodiment of the present disclosure.

In an example implementation, the first TAG may comprise (e.g., consist of) the first cell, a second cell, and a third cell. In an example implementation, the first TAG may comprise (e.g., consist of) the first beam of the first cell and a third beam of the first cell. In an example implementation, the first TAG may comprise (e.g., consist of) the first beam of the first cell and a second cell. In an example implementation, the second TAG may comprise (e.g., consist of) the first cell, a fourth cell, and a fifth cell. In an example implementation, the second TAG may comprise (e.g., consist of) the second beam of the first cell and a fourth beam of the first cell. In an example implementation, the second TAG may comprise (e.g., consist of) the second beam of the first cell and a fourth cell. In an example, the first TAG may comprise one or more beams and/or one or more cells served by a first TRP. In an example, the second TAG may comprise one or more beams and/or one or more cells served by a second TRP. In an example, the first TRP may comprise a first CORESET group of the first cell, and/or the second TRP may comprise a second CORESET group of the first cell. In an example, the first TRP may comprise at least one first TCI state for the first cell, and/or the second TRP may comprise at least one second TCI state for the first cell. FIG. 27 shows an example TA grouping of the wireless device for the first TAG (e.g., TAG1) associated with first TA and the second TAG (TAG2) associated with the second TA.

In an example, the access information may comprise random access configuration parameters associated with at least one third beam (e.g., SSB, CSI-RS) (e.g., The at least one third beam may comprise the first beam and/or the second beam) for the wireless device to access the first cell. The random access configuration parameters may comprise at least one of: a beam index; a random access preamble index (e.g., integer value 0 to 63) of a random access preamble; at least one random access occasion (e.g., for CSI-RS); a reference signal received power (RSRP) value (e.g., threshold) indicating a range of received power (e.g., to perform a contention free random access procedure). In an example, the at least one third beam may be transmitted by a third TRP (e.g., the third TRP may be one of the first TRP or the second TRP). In an example, if an RSRP of the at least one third beam is in the range of received power indicated by the RSRP value, the wireless device may perform a random access using the random access preamble and/or the at least one random access occasion for the at least one third beam. In an example, if an RSRP of the at least one third beam is in the range of received power indicated by the RSRP value, the wireless device may perform a contention based random access to access the first cell.

In an example, the access information may comprise a power value for the wireless device to determine initiation of a random access using the random access configuration parameters (e.g., instead of RACH-less access for the first cell; instead of transmitting transport blocks of PUSCH to access the first cell). The wireless device may compare the power value with a received power of the first beam and/or the second beam for the initiation of the random access using the random access configuration parameters. In an example, the access information may comprise a time value for the wireless device to determine initiation of a random access using the random access configuration parameters. The wireless device may initiate the random access (e.g., by transmitting a random access preamble) in response to a time duration of the time value passing (e.g., in response to expiry of the time duration) since/from/after the first signal (e.g., one of the transport blocks, PUSCH, random access preamble, and/or the like to access the first cell) transmission to the first base station. In an example, a random access using the random access configuration parameters may comprise at least one of: a contention-free random access; a contention-based random access; and/or the like. In an example, a random access using the random access configuration parameters may comprise at least one of: a 2-step random access; a 4-step random access; and/or the like. The access information may comprise a power value (e.g., threshold) for selection of the 2-step random access or the 4 step random access.

In an example, the access information may indicate a second time value. The second time value may be a time duration that a TA indicated by the access information is valid. After a time duration of the second time value (e.g., from receiving a handover command), the wireless device may initiate a random access (e.g., instead of transmitting transport blocks via PUSCH to access the first cell) for the first cell.

In an example, the access information may indicate at least one of: a first panel of the wireless device for transmission associated with the first beam; a second panel of the wireless device for transmission associated with the second beam; and/or the like. The wireless device may use the first panel of the wireless device to transmit the transport blocks to access the first cell, in response to the selected beam being the first beam. The wireless device may use the second panel of the wireless device to transmit the transport blocks to access the first cell, in response to the selected beam being the second beam.

In an example, the access information may be determined by at least one of: the first base station (e.g., for a handover and/or a secondary base station addition/modification of the wireless device) and/or the second base station (e.g., for a secondary base station addition/modification of the wireless device).

In an example, the first base station may send, to the second base station and in response to the request message and/or in response to determining to accept the request for the radio resource configuration initiation (e.g., the handover or the secondary node addition/modification) of the wireless device, a request acknowledge message (e.g., a handover request acknowledge message or a secondary base station addition/modification request acknowledge message) comprising the access information for the first cell. In an example, the second base station may receive, from the first base station, a handover request acknowledge message (e.g., for the handover) comprising the access information for the first cell. In an example, the second base station may receive, from the first base station, a configuration request acknowledge message (e.g., for the secondary node addition/modification) comprising the access information for the first cell. The configuration request acknowledge message may comprise at least one of: a secondary node addition request acknowledge message (e.g., S-node addition request acknowledge message, SeNB addition request acknowledge message, etc.); a secondary node modification request acknowledge message (e.g., S-node modification request acknowledge message, SeNB modification request acknowledge message, etc.); and/or the like.

In an example, the first base station may send the request acknowledge message to the second base station via the direct interface (e.g., the Xn interface and/or the X2 interface) between the first base station and the second base station. In an example, the first base station may send indication of the request acknowledge of the radio resource configuration initiation (e.g., the handover or the secondary node addition/modification) via the indirect connection (e.g., comprising the one or more N2 or S1 interfaces) through the one or more core network nodes (e.g., AMF, MME, etc.). In an example, the first base station may send, to the AMF, an S1/N2 handover request acknowledge message for the handover of the wireless device, and/or the AMF may send, to the second base station and based on the handover request acknowledge message, an S1/N2 handover command message for the handover of the wireless device.

In an example, the request acknowledge message may comprise at least one of: a UE identifier of the wireless device; a cell identifier (e.g., physical cell identifier, PCI, cell global identifier, CGI, etc.) of the first cell (e.g., target cell); security capability information and/or security information of the wireless device; PDU session information (e.g., accepted/setup/modified/rejected/released PDU session list, QoS flow list, QoS, S-NSSAI, NSSAI, etc.) of the wireless device; RRC contexts (e.g., RRC configuration parameters that may be configured based on the measurement results of the wireless device for the first cell) of the wireless device; and/or the like.

In an example, the second base station may send, to the wireless device and/or based on the request acknowledge message, an RRC message (e.g., a handover command message (e.g., a handover command) and/or an RRC reconfiguration message) comprising the access information. In an example, the RRC message may comprise at least one of: a handover command message; an RRC reconfiguration message; and/or the like. In an example, the handover command message may be configured by the first base station, and the first base station may forward the handover command to the wireless device. The RRC message (e.g., the handover command message and/or the RRC reconfiguration message) may be based on the handover request acknowledge message. The handover request acknowledge message may comprise the RRC reconfiguration message (e.g., comprising the access information) that is the handover command message. The RRC message (e.g., the RRC reconfiguration message) may be based on the configuration request acknowledge message (e.g., the secondary node addition request acknowledge message, the secondary node modification request acknowledge message).

In an example, the handover command message may indicate a condition for the wireless device to initiate an access to the first cell. The condition may comprise an initiation power value. In an example, when a received power of the first cell (e.g., or at least one of the first beam or the second beam) becomes/is equal to or higher than the initiation power value, the wireless device may send signal (e.g., transport blocks via PUSCH to access the first cell, and/or preamble for random access) to the first base station. In an example, if the second base station determines the access information, the second base station may include the access information in the RRC message (e.g., the RRC reconfiguration message).

In an example, the wireless device may determine one of the first beam and the second beam as a selected beam to access the first cell. The wireless device may select, based on the access information, a selected TA (e.g., among the first TA and the second TA) associated with the selected beam. The selected TA may be one of the first TA and the second TA. In an example, the wireless device may measure a first RSRP and/or a first RSRQ of the first beam, and/or measure a second RSRP and/or a second RSRQ of the second beam. In an example, the determining the one of the first beam and the second beam as the selected beam may comprise determining the one of the first beam and the second beam based on at least one of: the first RSRP and/or the first RSRP of the first beam (e.g., SS or CSI-RS); and/or the second RSRP and/or the second RSRQ of the second beam (e.g., SS or CSI-RS). In an example, if the first RSRP is equal to or larger than a power value and/or if the first RSRQ is equal to or larger than a power value, the wireless device may select the first beam as the selected beam. In an example, if the second RSRP is equal to or larger than a power value and/or if the second RSRQ is equal to or larger than a power value, the wireless device may select the second beam as the selected beam. In an example, if the first RSRP is larger than the second RSRP and/or if the first RSRQ is larger than the second RSRQ, the wireless device may select the first beam as the selected beam.

In an example, if the first beam is selected as the selected beam, the wireless device select, as the selected TA, the first TA that is indicated for at least one of: the first beam, the first TRP, the first TAG, the first CORESET group, the first TCI state, the first QCL type, and/or the like. In an example, if the second beam is selected as the selected beam, the wireless device select, as the selected TA, the second TA that is indicated for at least one of: the second beam, the second TRP, the second TAG, the second CORESET group, the second TCI state, the second QCL type, and/or the like.

In an example, the wireless device may transmit, based on the access information, transport blocks (e.g., via PUSCH) based on the selected TA to access the first cell. In an example, the transmitting the transport blocks may comprise transmitting the transport blocks via a physical uplink shared channel (PUSCH) associated with the selected beam. In an example, the transmitting the transport blocks may comprise applying the selected TA when transmitting the transport blocks. In an example, before transmitting the transport blocks, the wireless device may perform synchronization to the first cell and/or the first base station based on the selected TA. The wireless device may transmit the transport block based on the synchronization. The wireless device may derive keys that is specific to the first base station and/or the first cell, and/or may configure selected security algorithms based on the keys to be used in the first cell.

In an example, if the selected beam is the first beam, the wireless device may send/transmit the transport block via the first resource indicated by the access information. If the selected beam is the second beam, the wireless device may send/transmit the transport block via the second resource indicated by the access information. In an example, the wireless device may receive, from the first base station, a downlink control information (DCI) (e.g., via PDCCH of the first cell) indicating an uplink grant resource (e.g., uplink grant) for the transport blocks. The transmitting the transport blocks may comprise transmitting the transport blocks via the uplink grant resource.

In an example, the transport blocks, which is transmitted by the wireless device to access the first cell, may comprise an uplink RRC message (e.g., an RRC reconfiguration complete message, an RRC connection reconfiguration complete message). The uplink RRC message may be scrambled with and/or may comprise a C-RNTI of the wireless device at the first cell. The first base station may confirm the handover based on receiving the uplink RRC message (e.g., the RRC reconfiguration complete message, an RRC connection reconfiguration complete message). In an example, the transport blocks may further comprise an uplink buffer status report (BSR), uplink data, and/or the like. The first base station may verify the C-RNTI. Based on the verification of the C-RNTI of the wireless device, the first base station may begin sending data to the wireless device. The handover may be completed for the wireless device when the wireless device receives a MAC CE indicating a UE contention resolution identity from the first base station. The first base station may send, to the second base station and/or based on receiving the uplink RRC message, a path switch request message to a core network node (e.g., the AMF, an MME, etc.) to inform that the wireless device has changed a cell and/or a base station.

Figure 24:
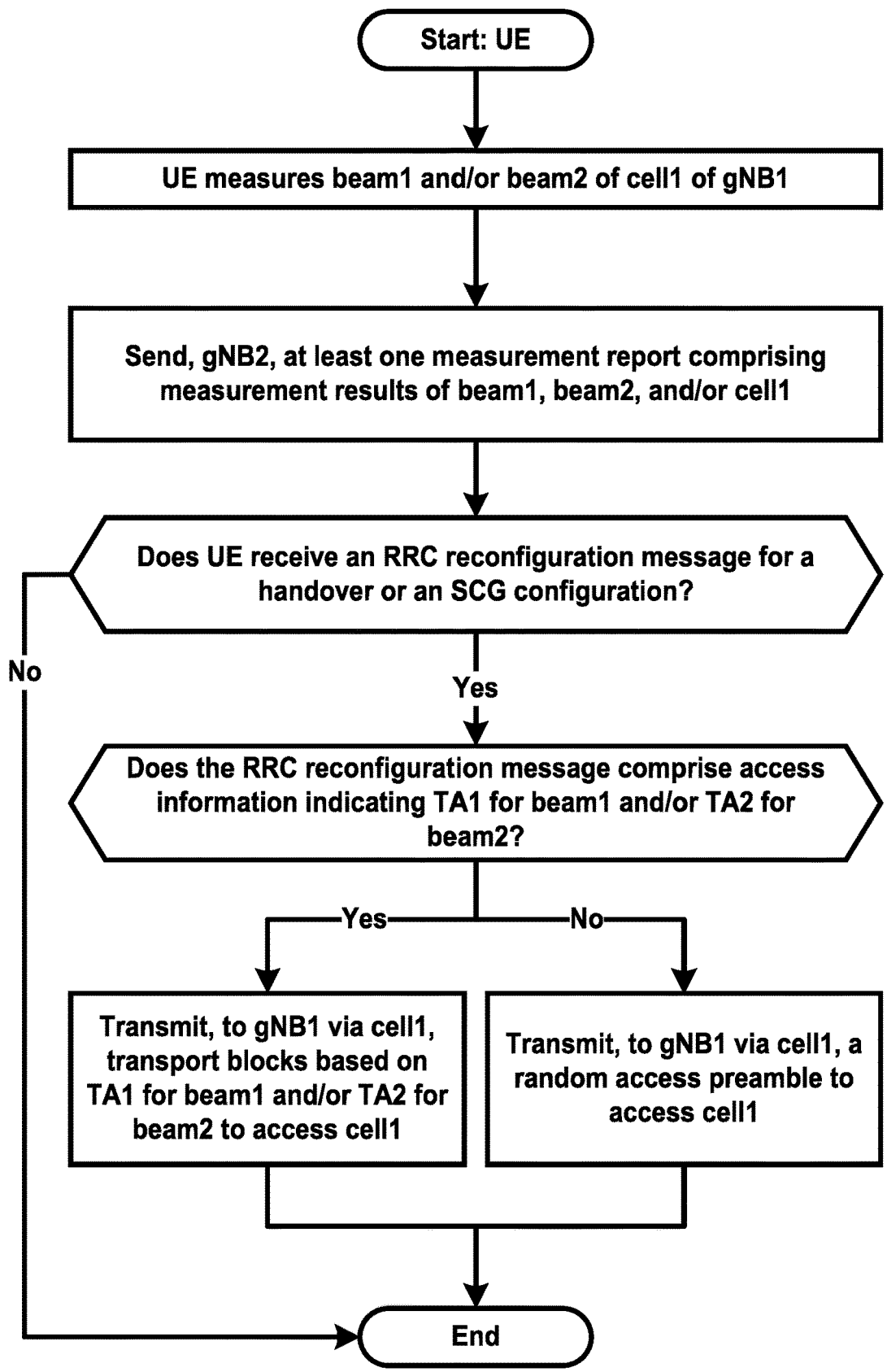
FIG. 24 is a diagram of an aspect of an example embodiment of the present disclosure.
Figure 25:
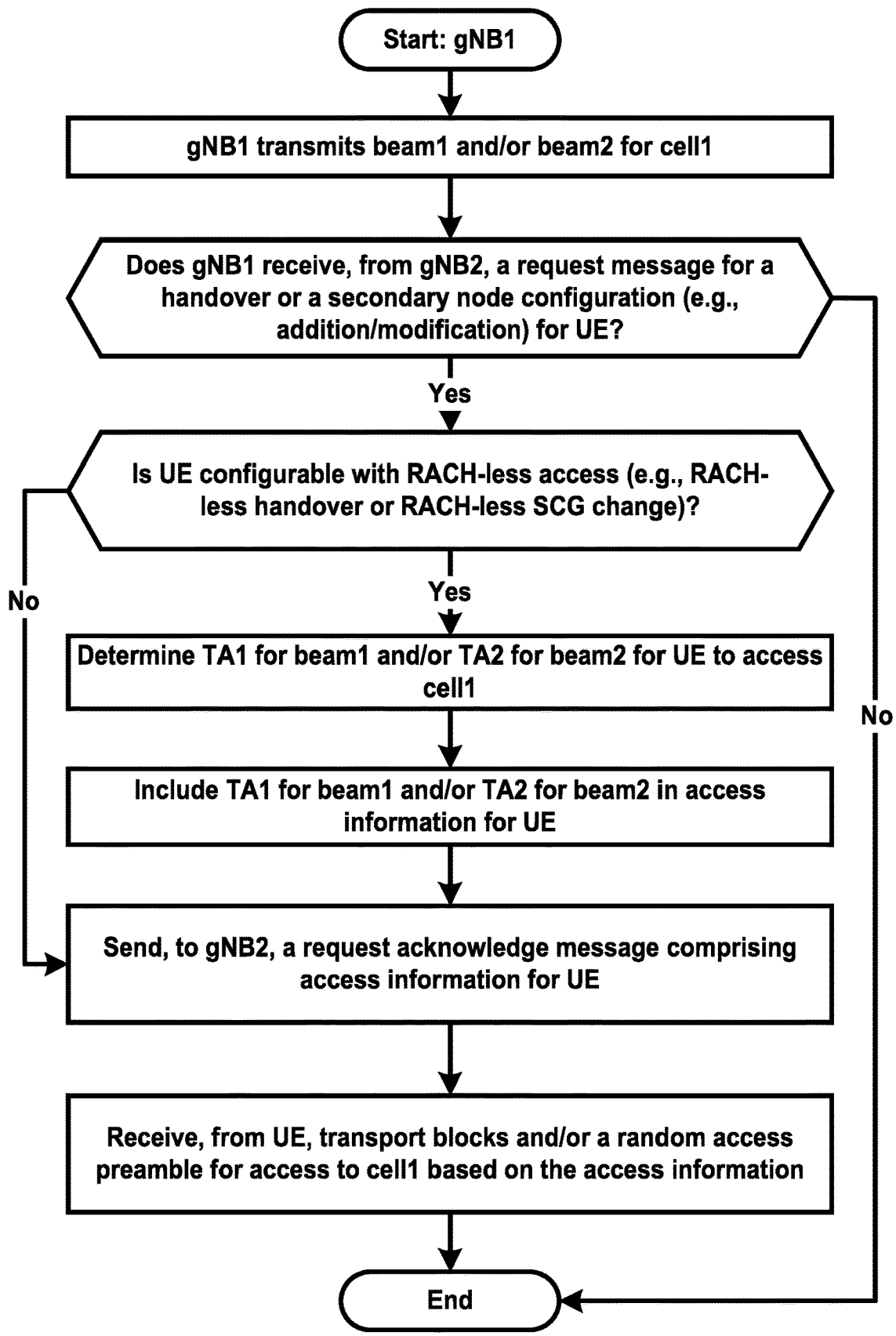
FIG. 25 is a diagram of an aspect of an example embodiment of the present disclosure.

In an example, as shown in FIG. 24 and/or FIG. 25, a wireless device may receive, from a second base station, a radio resource control (RRC) message comprising access information for a first cell of a first base station. The access information may indicate a first timing advance (TA) associated with a first beam of the first cell and a second TA associated with a second beam of the first cell. The wireless device may determine one of the first beam and the second beam as a selected beam. The wireless device may select a selected TA (e.g., among the first TA and the second TA) associated with the selected beam. The selected TA may be one of the first TA and the second TA. The wireless device may transmit transport blocks based on the selected TA to access the first cell.

In an example, the access information may indicate at least one of: a first panel of the wireless device for transmission associated with the first beam; a second panel of the wireless device for transmission associated with the second beam; and/or the like. The wireless device may use the first panel of the wireless device to transmit the transport blocks in response to the selected beam being the first beam. The wireless device may use the second panel of the wireless device to transmit the transport blocks in response to the selected beam being the second beam.

In an example, the first base station may be the second base station. In an example, the second base station may be a master base station (e.g., master node, MgNB, MeNB, M-node, etc.) serving a master cell group (MCG) of the wireless device. The first base station may be a secondary base station (e.g., secondary node, SgNB, SeNB, S-node, etc.) serving a secondary cell group (SCG) of the wireless device. In an example, the RRC message may comprise at least one of: a handover command message; an RRC reconfiguration message; and/or the like.

In an example, the first cell may comprise the first beam and the second beam. The first beam and/or the second beam may be associated with at least one of: a channel state information-reference signal (CSI-RS); a synchronization signal (SS); and/or the like. In an example, the first beam may be transmitted by a first transmission reception point (TRP). The second beam may be transmitted by a second TRP. In an example, the first beam may be transmitted by a first base station distributed unit of the first base station. The second beam may be transmitted by a second base station distributed unit of the first base station.

In an example, the first TA and/or the second TA may comprise at least one of: a zero TA (e.g., TA=0); a TA of a primary timing advance group (TAG) of a master cell group (MCG); a TA of a secondary TAG of a master cell group (MCG); a TA of a primary TAG of a secondary cell group (SCG); a TA of a secondary TAG of a secondary cell group (SCG); and/or the like. In an example, the access information may comprise at least one of: a first value of the first TA; and/or a second value of the second TA. In an example, the access information may indicate for the first TA and/or the second TA at least one of: a TA is zero; a primary TAG of an MCG; a secondary TAG (e.g., a TAG identifier of the secondary TAG) of an MCG; a primary TAG of an SCG; and/or a secondary TAG (e.g., a TAG identifier of the secondary TAG) of an SCG.

In an example, the access information may comprise first fields for first resources associated with the first beam. The first fields may comprise at least one of: a first number of configured hybrid automatic repeat request (HARQ) processes; a first uplink grant; a first uplink scheduling interval; a first uplink starting subframe/slot/symbol; and/or the like. In an example, the access information may comprise second fields for second resources associated with the second beam. The second fields may comprise at least one of: a second number of configured hybrid automatic repeat request (HARQ) processes; a second uplink grant; a second uplink scheduling interval; a second uplink starting subframe/slot/symbol; and/or the like. In an example, the transmitting the transport blocks may comprise transmitting the transport blocks via the first resources or the second resources associated with the selected beam.

In an example, the wireless device may receive, from the first base station, a downlink control information (DCI) indicating an uplink grant resource for the transport blocks. The transmitting the transport blocks may comprise transmitting the transport blocks via the uplink grant resource.

In an example, the access information may comprise at least one of: a beam index of the first beam; an identifier of a first TRP associated with the first beam and/or the first TA; a group identifier of a first control resource set (CORESET) group associated with the first TRP and/or the first TA; an identifier of a first transmission configuration indication (TCI) state associated with the first TRP and/or the first TA; and/or the like. In an example, the access information may comprise at least one of: a beam index of the second beam; an identifier of a second TRP associated with the second beam and/or the second TA; a group identifier of a second CORESET group associated with the second TRP and/or the second TA; an identifier of a second TCI state associated with the second TRP and/or the second TA; and/or the like.

In an example, the access information may comprise at least one of: an identifier of a first TAG associated with the first beam and/or the first TA; and/or an identifier of a second TAG associated with the second beam and/or the second TA. In an example, the first TAG or the second TAG may comprise at least one of: one or more cells; one or more TRPs; one or more beams (e.g., SSB, CSI-RS beam); one or more CORESET groups; one or more TCI states; and/or the like.

In an example, the access information may comprise random access configuration parameters associated with at least one third beam (e.g., SSB, CSI-RS) (e.g., The at least one third beam may comprise the first beam and/or the second beam) for the wireless device to access the first cell. The random access configuration parameters may comprise at least one of: a beam index; a random access preamble index (e.g., integer value 0 to 63); at least one random access occasion (e.g., for CSI-RS); a reference signal received power (RSRP) value (e.g., threshold) indicating a range of received power (e.g., to perform a contention free random access procedure). In an example, the at least one third beam may be transmitted by a third TRP.

In an example, the access information may comprise a power value for the wireless device to determine initiation of a random access using the random access configuration parameters. The wireless device may compare the power value with a received power of the first beam and/or the second beam for the initiation of the random access. In an example, the access information may comprise a time value for the wireless device to determine initiation of a random access using the random access configuration parameters. The wireless device may initiate the random access in response to a time duration of the time value passing (e.g., in response to expiry of the time duration) since/from/after the first signal (e.g., one of the transport blocks, PUSCH, random access preamble, etc.) transmission to the first base station. In an example, a random access using the random access configuration parameters may comprise at least one of: a contention-free random access; a contention-based random access; and/or the like.

In an example, the access information may be determined by at least one of: the first base station (e.g., for a handover of the wireless device) and/or the second base station (e.g., for a secondary base station addition/modification of the wireless device).

In an example, the transmitting the transport blocks may comprise transmitting the transport blocks via a physical uplink shared channel (PUSCH) associated with the selected beam. In an example, the determining the one of the first beam and the second beam as the selected beam may comprise determining the one of the first beam and the second beam based on at least one of: a first RSRP of the first beam (e.g., SS or CSI-RS); and/or a second RSRP of the second beam (e.g., SS or CSI-RS). In an example, the transmitting the transport blocks may comprise applying the selected TA when transmitting the transport blocks.

In an example, the wireless device may receive, from the first base station, at least one of: the first beam (e.g., SS or CSI-RS); the second beam (e.g., SS or CSI-RS); the at least one third beam; and/or the like. In an example, the wireless device may send to the second base station and based on the receiving the first beam (e.g., SS or CSI-RS) and/or the second beam (e.g., SS or CSI-RS), at least one measurement report comprising measurement results of the first cell. The measurement results may comprise at least one of: a first received power of the first beam (e.g., SS or CSI-RS); a first received quality of the first beam (e.g., SS or CSI-RS); a second received power of the second beam (e.g., SS or CSI-RS); a second received quality of the second beam (e.g., SS or CSI-RS); a third received power of the at least one third beam (e.g., SS or CSI-RS); a third received quality of the at least one third beam (e.g., SS or CSI-RS); and/or the like.

In an example, the second base station may determine, based on the at least one measurement report, a handover of the wireless device to the first cell. In an example, the second base station may send, to the first base station, a handover request message for the handover of the wireless device. In an example, the second base station may receive, from the first base station, a handover request acknowledge message comprising the access information for the first cell. The RRC message (e.g., comprising the access information) may be based on the handover request acknowledge message.

In an example, the second base station may determine, based on the at least one measurement report, a secondary node configuration (e.g., a secondary node addition or modification) for the wireless device. In an example, the second base station may send, to the first base station, a configuration request message (e.g., a secondary node addition request message or a secondary node modification request message) for the secondary node configuration for the wireless device. In an example, the second base station may receive, from the first base station, a configuration request acknowledge message comprising the access information for the first cell. The RRC message (e.g., comprising the access information) may be based on the configuration request acknowledge message. In an example, the secondary node configuration may comprise at least one of: a secondary node addition; a secondary node modification; and/or the like. The secondary node configuration may comprise configuring the first cell as an SCG for the wireless device.

In an example, as shown in FIG. 24, a wireless device may receive, from a second base station, an RRC message comprising access information for a first cell of a first base station. The access information may indicate a first TA associated with a first beam of the first cell and a second TA associated with a second beam of the first cell. The wireless device may determine a selected TA associated with a selected beam. The selected beam may be one of the first beam and the second beam. The selected TA may be one of the first timing advance and the second timing advance. The wireless device may transmit transport blocks based on the selected timing advance to access the first cell.

In an example, as shown in FIG. 25, a first base station may transmit a first beam and a second beam via a first cell. The first base station may receive, from a second base station, a request message for a handover (e.g., or a secondary node addition/modification) of a wireless device to the first cell of the first base station. The first base station may determine access information for the wireless device. The access information may indicate a first TA associated with the first beam of the first cell and a second TA associated with the second beam of the first cell. The first base station may send, to the second base station and in response to the request message, a request acknowledge message comprising the access information. The first base station may receive, from the wireless device, transport blocks based on one of the first timing advance or the second timing advance.

In an example, a second base station may receive, from a wireless device, at least one measurement report comprising measurement results of a first cell. The second base station may determine, based on the at least one measurement report, a handover (e.g., or a secondary node addition/modification) of the wireless device to the first cell. The second base station may send, to the first base station, a request message for the handover (e.g., or a secondary node addition/modification) of the wireless device. The second base station may receive, from the first base station, a request acknowledge message comprising access information for the first cell. The access information may indicate a first TA associated with the first beam of the first cell and a second TA associated with the second beam of the first cell. The second base station may send, to the wireless device, an RRC message (e.g., a handover command or an RRC reconfiguration message) comprising the access information.

In an example, a wireless device may receive, from a second base station, a radio resource control message comprising access information for a first cell of a first base station. The access information may indicate a first timing advance associated with a first beam of the first cell. The wireless device may determine/select the first beam to access the first cell. The wireless device may transmit, based on the determining the first beam, transport blocks based on the first timing advance to access the first cell.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 29:
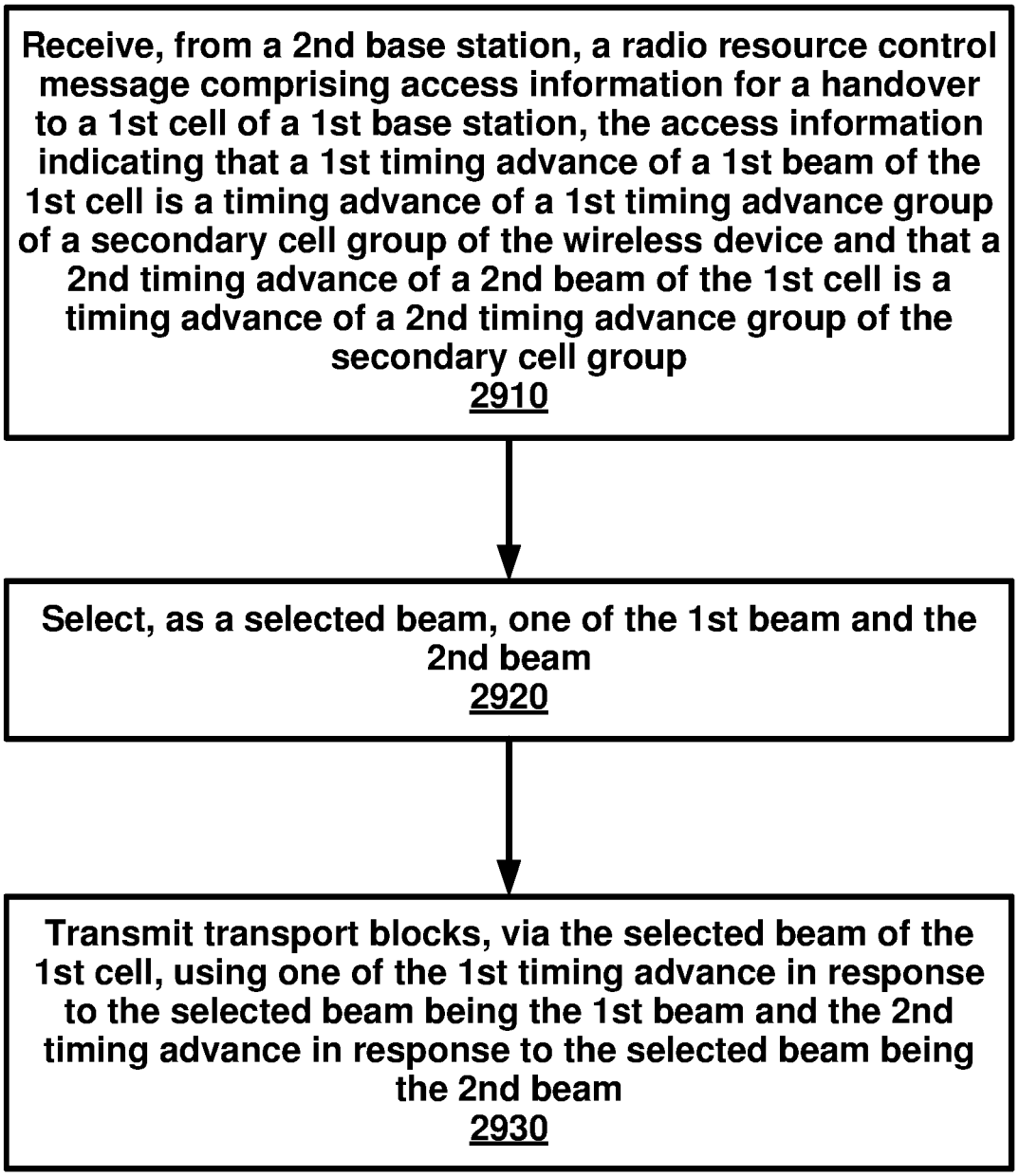
FIG. 29 is a diagram of an aspect of an example embodiment of the present disclosure.

FIG. 29 is a diagram of an aspect of an example embodiment of the present disclosure. At 2910, a wireless device may receive, from a second base station, a radio resource control message comprising access information for a handover to a first cell of a first base station. The access information may indicate that a first timing advance of a first beam of the first cell is a timing advance of a first timing advance group of a secondary cell group of the wireless device and that a second timing advance of a second beam of the first cell is a timing advance of a second timing advance group of the secondary cell group. At 2920, the wireless device may select, as a selected beam, one of the first beam and the second beam. At 2930, the wireless device may transmit transport blocks, via the selected beam of the first cell, using one of the first timing advance in response to the selected beam being the first beam and the second timing advance in response to the selected beam being the second beam.

According to an example embodiment, the first base station may be the second base station. When the wireless device receives the radio resource control message, the second base station may be a master base station serving a master cell group of the wireless device and/or the first base station may be a secondary base station serving the secondary cell group of the wireless device. The first beam may be transmitted by a first transmission reception point or a first base station distributed unit of the first base station. The second beam may be transmitted by a second transmission reception point or a second base station distributed unit of the first base station. The first beam or the second beam may be associated with a channel state information-reference signal. The first beam or the second beam may be associated with a synchronization signal.

According to an example embodiment, the first timing advance group or the second timing advance group may be a primary timing advance group. The first timing advance group or the second timing advance group may be a secondary timing advance group. The access information may indicate that a third timing advance of a third beam of the first cell is a timing advance of zero. The access information may indicate that a third timing advance of a third beam of the first cell is a timing advance of a primary timing advance group of a master cell group. The access information may indicate that a third timing advance of a third beam of the first cell is a timing advance of a secondary timing advance group of a master cell group. The access information may indicate that a third timing advance of a third beam of the first cell is a timing advance of a primary timing advance group of the secondary cell group. The access information may indicate that a third timing advance of a third beam of the first cell is a timing advance of a secondary timing advance group of the secondary cell group.

According to an example embodiment, the access information may indicates a beam index of the first beam. The access information may indicates the first timing advance is for a first transmission reception point (TRP) associated with the first beam. The access information may indicates the first timing advance is for a first control resource set (CORESET) group associated with the first beam. The access information may indicates the first timing advance is for a first transmission configuration indication (TCI) state associated with the first beam. The access information may indicates the first timing advance is for a third timing advance group of the wireless device after completion of the handover. The access information may comprise a beam index of the second beam. The access information may comprise the second timing advance is for a second TRP associated with the second beam. The access information may comprise the second timing advance is for a second CORESET group associated with the second beam. The access information may comprise the second timing advance is for a second TCI state associated with the second beam. The access information may comprise the second timing advance is for a fourth timing advance group of the wireless device after completion of the handover.

According to an example embodiment, the access information may comprise a time value indicating a time duration that the first timing advance or the second timing advance may be valid for the handover. The selecting the one of the first beam and the second beam may comprise selecting the one of the first beam and the second beam based on a first reference signal received power of the first beam. The selecting the one of the first beam and the second beam may comprise selecting the one of the first beam and the second beam based on a second reference signal received power of the second beam.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a second base station, a radio resource control message comprising access information for a handover to a first cell of a first base station, the access information indicating:
      a first timing advance of a first beam of the first cell is a timing advance of a first timing advance group of a secondary cell group of the wireless device; and
      a second timing advance of a second beam of the first cell is a timing advance of a second timing advance group of the secondary cell group;
   selecting, as a selected beam, one of:
      the first beam; and
      the second beam; and
   transmitting transport blocks, via the selected beam of the first cell, using one of:
      the first timing advance in response to the selected beam being the first beam; and
      the second timing advance in response to the selected beam being the second beam.

2. The method of claim 1, wherein the first base station is the second base station.

3. The method of claim 1, wherein when receiving the radio resource control message:
   the second base station is a master base station serving a master cell group of the wireless device; and
   the first base station is a secondary base station serving the secondary cell group of the wireless device.

4. The method of claim 1, wherein:
   the first beam is transmitted by a first transmission reception point or a first base station distributed unit of the first base station; and
   the second beam is transmitted by a second transmission reception point or a second base station distributed unit of the first base station.

5. The method of claim 1, wherein the first beam or the second beam is associated with at least one of:
   a channel state information-reference signal; or
   a synchronization signal.

6. The method of claim 1, wherein the first timing advance group or the second timing advance group is at least one of:
   a primary timing advance group; or
   a secondary timing advance group.

7. The method of claim 1, wherein the access information indicates that a third timing advance of a third beam of the first cell is a timing advance of at least one of:
   zero;
   a primary timing advance group of a master cell group;
   a secondary timing advance group of a master cell group;
   a primary timing advance group of the secondary cell group; or
   a secondary timing advance group of the secondary cell group.

8. The method of claim 1, wherein the access information indicates at least one of:
   a beam index of the first beam;
   the first timing advance is for a first transmission reception point (TRP) associated with the first beam;
   the first timing advance is for a first control resource set (CORESET) group associated with the first beam;
   the first timing advance is for a first transmission configuration indication (TCI) state associated with the first beam;
   the first timing advance is for a third timing advance group of the wireless device after completion of the handover;
   a beam index of the second beam;
   the second timing advance is for a second TRP associated with the second beam;
   the second timing advance is for a second CORESET group associated with the second beam;
   the second timing advance is for a second TCI state associated with the second beam; or
   the second timing advance is for a fourth timing advance group of the wireless device after completion of the handover.

9. The method of claim 1, wherein the access information comprises a time value indicating a time duration that the first timing advance or the second timing advance is valid for the handover.

10. The method of claim 1, wherein the selecting the one of the first beam and the second beam comprises selecting the one of the first beam and the second beam based on at least one of:
- a first reference signal received power of the first beam; or
- a second reference signal received power of the second beam.

11. A wireless device comprising:
one or more processors; and
memory storing instructions that, when executed by the one or more processors, cause the wireless device to:
  receive, from a second base station, a radio resource control message comprising access information for a handover to a first cell of a first base station, the access information indicating:
    a first timing advance of a first beam of the first cell is a timing advance of a first timing advance group of a secondary cell group of the wireless device; and
    a second timing advance of a second beam of the first cell is a timing advance of a second timing advance group of the secondary cell group;
  select, as a selected beam, one of:
    the first beam; and
    the second beam; and
  transmit transport blocks, via the selected beam of the first cell, using one of:
    the first timing advance in response to the selected beam being the first beam; and
    the second timing advance in response to the selected beam being the second beam.

12. The wireless device of claim 11, wherein the first base station is the second base station.

13. The wireless device of claim 11, wherein when receiving the radio resource control message:
- the second base station is a master base station serving a master cell group of the wireless device; and
- the first base station is a secondary base station serving the secondary cell group of the wireless device.

14. The wireless device of claim 11, wherein:
- the first beam is transmitted by a first transmission reception point or a first base station distributed unit of the first base station; and
- the second beam is transmitted by a second transmission reception point or a second base station distributed unit of the first base station.

15. The wireless device of claim 11, wherein the first beam or the second beam is associated with at least one of:
- a channel state information-reference signal; or
- a synchronization signal.

16. The wireless device of claim 11, wherein the first timing advance group or the second timing advance group is at least one of:
- a primary timing advance group; or
- a secondary timing advance group.

17. The wireless device of claim 11, wherein the access information indicates that a third timing advance of a third beam of the first cell is a timing advance of at least one of:
- zero;
- a primary timing advance group of a master cell group;
- a secondary timing advance group of a master cell group;
- a primary timing advance group of the secondary cell group; or
- a secondary timing advance group of the secondary cell group.

18. The wireless device of claim 11, wherein the access information indicates at least one of:
- a beam index of the first beam;
- the first timing advance is for a first transmission reception point (TRP) associated with the first beam;
- the first timing advance is for a first control resource set (CORESET) group associated with the first beam;
- the first timing advance is for a first transmission configuration indication (TCI) state associated with the first beam;
- the first timing advance is for a third timing advance group of the wireless device after completion of the handover;
- a beam index of the second beam;
- the second timing advance is for a second TRP associated with the second beam;
- the second timing advance is for a second CORESET group associated with the second beam;
- the second timing advance is for a second TCI state associated with the second beam; or
- the second timing advance is for a fourth timing advance group of the wireless device after completion of the handover.

19. The wireless device of claim 11, wherein the access information comprises a time value indicating a time duration that the first timing advance or the second timing advance is valid for the handover.

20. A system comprising:
a wireless device comprising:
  one or more processors; and
  memory storing instructions that, when executed by the one or more processors, cause the wireless device to:
    receive, from a second base station, a radio resource control message comprising access information for a handover to a first cell of a first base station, the access information indicating:
      a first timing advance of a first beam of the first cell is a timing advance of a first timing advance group of a secondary cell group of the wireless device; and
      a second timing advance of a second beam of the first cell is a timing advance of a second timing advance group of the secondary cell group;
    select, as a selected beam, one of:
      the first beam; and
      the second beam; and
    transmit transport blocks, via the selected beam of the first cell, using one of:
      the first timing advance in response to the selected beam being the first beam; and
      the second timing advance in response to the selected beam being the second beam;

the first base station comprising:
one or more processors; and
memory storing instructions that, when executed by the one or more processors, cause the first base station to:
receive, from the second base station, a request message requesting the handover of the wireless device;
determine, based on the request message, the access information;
send, to the second base station, a request acknowledge message comprising the access information for the handover; and
receive, from the wireless device, the transport blocks via the selected beam of the first cell; and the second base station comprising:
one or more processors; and
memory storing instructions that, when executed by the one or more processors, cause the second base station to:
determine the handover based on a measurement report of the wireless device for the first cell;
send, to the first base station, the request message;
receive, from the first base station, the request acknowledge message in response to the request message; and
send, to the wireless device the radio resource control message comprising the access information.

* * * * *